(12) United States Patent
Lin et al.

(10) Patent No.: US 10,491,904 B2
(45) Date of Patent: Nov. 26, 2019

(54) CHANNEL LINE BUFFER DATA PACKING SCHEME FOR VIDEO CODECS

(71) Applicant: QUALCOMM Incorporated, San Diego, CA (US)

(72) Inventors: Shu Lin, San Diego, CA (US); Mang Li, Fremont, CA (US); Kai Wang, San Diego, CA (US); Atul Garg, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/252,231

(22) Filed: Jan. 18, 2019

(65) Prior Publication Data

US 2019/0174135 A1    Jun. 6, 2019

Related U.S. Application Data

(62) Division of application No. 14/839,666, filed on Aug. 28, 2015, now Pat. No. 10,277,904.

(51) Int. Cl.
*H04N 19/15* (2014.01)
*H04N 19/66* (2014.01)
(Continued)

(52) U.S. Cl.
CPC .......... *H04N 19/15* (2014.11); *H04N 19/152* (2014.11); *H04N 19/423* (2014.11);
(Continued)

(58) Field of Classification Search
CPC .... H04N 19/15; H04N 19/152; H04N 19/423; H04N 19/433; H04N 19/66; H04N 19/88
See application file for complete search history.

(56) References Cited

U.S. PATENT DOCUMENTS 6,239,815 B1    5/2001   Frink et al.
9,530,466 B1 *  12/2016  Zhu ................. G11C 7/1009
(Continued)

FOREIGN PATENT DOCUMENTS

| EP | 0828238 A2 | 3/1998 |
|---|---|---|
| WO | WO-2004079916 A2 | 9/2004 |
| WO | WO-2008010146 A2 | 1/2008 |

OTHER PUBLICATIONS

Partial International Search Report—PCT/US2016/044300—ISA/EPO—dated Sep. 27, 2016.
(Continued)

*Primary Examiner* — Obafemi O Sosanya
(74) *Attorney, Agent, or Firm* — Shumaker & Sieffert, P.A.

(57) ABSTRACT

Video pixel line buffers are widely used for data processing in video codecs. Video data may be packed into buffers configured to store a plurality of words, each word comprising a series of bits. The video data may be associated with two or more channels. In order to reduce realization costs, data blocks from two different channels may be packed from opposite sides of a word in the buffer in opposite directions. In some embodiments, data blocks from two or more physical channels may be mapped to two or more virtual channels, the virtual channels having balanced data block sizes. The data blocks associated with the virtual channels may then be packed to one or more buffers.

14 Claims, 21 Drawing Sheets

(51) Int. Cl.
    *H04N 19/88*     (2014.01)
    *H04N 19/152*     (2014.01)
    *H04N 19/423*     (2014.01)
    *H04N 19/433*     (2014.01)

(52) U.S. Cl.
    CPC ........... *H04N 19/433* (2014.11); *H04N 19/66* (2014.11); *H04N 19/88* (2014.11)

(56) References Cited

U.S. PATENT DOCUMENTS

| | | |
|---|---|---|
| 2003/0031258 A1 | 2/2003 | Wang et al. |
| 2003/0122837 A1 | 7/2003 | Saxena et al. |
| 2007/0076511 A1 | 4/2007 | Choi |
| 2011/0298984 A1* | 12/2011 | Schoenblum ........ H04N 7/0127 348/607 |
| 2012/0287166 A1 | 11/2012 | Wyatt |
| 2012/0301157 A1* | 11/2012 | Qian ................ H04B 10/25133 398/192 |
| 2013/0251006 A1 | 9/2013 | Maji et al. |
| 2014/0105493 A1 | 4/2014 | Wu et al. |
| 2014/0254929 A1* | 9/2014 | Wu ..................... H04N 19/129 382/166 |
| 2015/0097926 A1 | 4/2015 | Chen et al. |
| 2016/0014426 A1* | 1/2016 | Richert ................. H04N 19/51 375/240.16 |
| 2017/0064308 A1 | 3/2017 | Lin et al. |

OTHER PUBLICATIONS

International Search Report and Written Opinion—PCT/US2016/044300—ISA/EPO—dated Nov. 24, 2016.

\* cited by examiner

CHANNEL LINE BUFFER DATA PACKING SCHEME FOR VIDEO CODECS

CROSS-REFERENCE TO RELATED APPLICATIONS

This application is a divisional application of U.S. patent application Ser. No. 14/839,666, entitled "CHANNEL LINE BUFFER DATA PACKING SCHEME FOR VIDEO CODECS", filed on Aug. 28, 2015. The disclosure of this application is hereby incorporated by reference in its entirety and for all purposes.

TECHNICAL FIELD

This disclosure is related to the field of video coding. More particularly, it is applicable to video pixel line buffers.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video coding techniques.

Video pixel line buffers may be used in many video processing applications. As blocks in a video frame are being processed, neighborhood data may be stored in one or more video pixel line buffers. The stored neighborhood data may then be used to process a later block in the frame. For example, a bottom row of a row of blocks may be saved in a video pixel line buffer as bottom neighborhood data, which may be used as top neighborhood data for a next row in the video frame.

SUMMARY

The systems, methods and devices of this disclosure each have several innovative aspects, no single one of which is solely responsible for the desirable attributes disclosed herein. Without limiting the scope of the appended claims, certain features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

In accordance with one or more aspects of the present disclosure, there is provided a method for packing video data operable by a video coding circuit for packing video data, the method comprising receiving the video data via a first channel and a second channel, the video data comprising a plurality of data blocks, and packing the plurality of data blocks into a buffer shared by the first and second channels, the buffer configured to store a plurality of words, each word comprising a series of bits that extends between a first side and a second side of the word. In some embodiments, the packing comprises interleaving data blocks from the first channel with data blocks from the second channel via packing the data blocks from the first channel in a first direction from the first side toward the second side, and packing the data blocks from the second channel in a second direction that is opposite of the first direction.

In some embodiments, the first and second channels are associated with a bottom line of a row of blocks in a video frame. The data blocks from the first channel or the second channel are used as a top line for a subsequent row of blocks in the video frame.

In some embodiments, the first channel may correspond to a de-interlacer, while the second channel may correspond to a down/up scaler.

In some embodiments, the buffer is implemented in DDR memory. In some embodiments, the buffer may be implemented in on-chip memory.

In some embodiments, a word of the buffer comprises one or more bits of junk data between one or more data blocks from the first channel on the first side of the word and one or more data blocks from the second channel on the second side of the word.

In some embodiments, the method may further comprise receiving a request for one or more data blocks associated with the first channel, and retrieving one or more data blocks from the first side of one or more words of the buffer. The method may further comprise receiving a request for one or more data blocks associated with the second channel, and retrieving one or more data blocks from the second side of one or more words of the buffer.

Another aspect of the disclosure provides a method for packing video data operable by a video coding circuit, the method comprising receiving the video data from two or more physical channels, the video data comprising a plurality of data blocks, mapping the data blocks from the physical channels to two or more virtual channels, and packing data blocks of the virtual channels into at least one buffer, the at least one buffer configured to store a plurality of words, each word comprising a series of bits that extends between a first bit at a first side and last bit at a second side. The packing may comprise interleaving data blocks from a first virtual channel with data blocks from a second virtual channel via packing the data blocks from the first virtual channel in a first direction from the first side toward the second side, and packing the data blocks from the second virtual channel in a second direction that is opposite of the first direction.

In some embodiments, a first data block size of a first physical channel of the two or more physical channels is different from a second data block size of a second physical channel of the two or more physical channels.

In some embodiments, the method may further comprise receiving a request for one or more data blocks associated with a physical channel of the two or more physical channels, unpacking virtual channel data from the one or more buffers, mapping the virtual channel data to one or more physical channels, and retrieving the requested data blocks through the physical channel.

In some embodiments, a number of buffers used to pack data from the two or more virtual channels is based at least in part upon a ratio between a total bit count of the two or more physical channels and a number of word bits of a buffer of the one or more buffers. In some embodiments, each buffer of the one or more buffers may be packed with data blocks from two virtual channels of the two or more virtual channels.

In some embodiments, a bit count of the first virtual channel and a bit count of the second virtual channel are balanced such that they are identical or differ by one bit. In some embodiments, a bit count of a virtual channel is based at least in part upon a total bit count of the two or more physical channels and a number buffers of the one or more buffers.

Another aspect of the disclosure provides a video coding circuit for packing video data. The video coding circuit may comprise a memory configured to store the video data, and a processor in communication with the memory, wherein the processor is configured to receive the video data via a first channel and a second channel, the video data comprising a plurality of data blocks, and pack the plurality of data blocks into a buffer shared by the first and second channels, the buffer configured to store a plurality of words, each word comprising a series of bits that extends between a first side and a second side of the word. The data blocks from the first channel and the data blocks from the second channel may be packed in an interleaving order, wherein the data blocks from the first channel are packed in a first direction from the first side toward the second side, and the data blocks from the second channel are packed in a second direction that is opposite of the first direction.

In some embodiments, the first and second channels are associated with a bottom line of a row of blocks in a video frame. The data blocks from the first channel or the second channel are used as a top line for a subsequent row of blocks in the video frame.

In some embodiments, the first channel may correspond to a de-interlacer, while the second channel may correspond to a down/up scaler.

In some embodiments, the buffer is implemented in DDR memory. In some embodiments, the buffer may be implemented in on-chip memory.

In some embodiments, a word of the buffer comprises one or more bits of junk data between one or more data blocks from the first channel on the first side of the word and one or more data blocks from the second channel on the second side of the word.

In some embodiments, the processor may be further configured to receive a request for one or more data blocks associated with the first channel, and retrieve one or more data blocks from the first side of one or more words of the buffer. The processor may be further configured to receive a request for one or more data blocks associated with the second channel, and retrieve one or more data blocks from the second side of one or more words of the buffer.

Another aspect of the disclosure provides a video coding circuit for packing video data. The video coding circuit may comprise a memory configured to store the video data, and a processor in communication with the memory, the processor being configured to: receive the video data from two or more physical channels, the video data comprising a plurality of data blocks, map the data blocks from the physical channels to two or more virtual channels, and pack data blocks of the virtual channels into at least one buffer, the at least one buffer configured to store a plurality of words, each word comprising a series of bits that extends between a first bit at a first side and last bit at a second side. The data blocks from a first virtual channel and the data blocks from a second virtual channel of the two or more virtual channels may be packed in an interleaving order, wherein the data blocks from the first virtual channel are packed in a first direction from the first side toward the second side, and the data blocks from the second virtual channel are packed in a second direction that is opposite of the first direction.

In some embodiments, a first data block size of a first physical channel of the two or more physical channels is different from a second data block size of a second physical channel of the two or more physical channels.

In some embodiments, the processor may be further configured to receive a request for one or more data blocks associated with a physical channel of the two or more physical channels, unpack virtual channel data from the one or more buffers, map the virtual channel data to one or more physical channels, and retrieve the requested data blocks through the physical channel.

In some embodiments, a number of buffers used to pack data from the two or more virtual channels is based at least in part upon a ratio between a total bit count of the two or more physical channels and a number of word bits of a buffer of the one or more buffers. In some embodiments, each buffer of the one or more buffers may be packed with data blocks from two virtual channels of the two or more virtual channels.

In some embodiments, a bit count of the first virtual channel and a bit count of the second virtual channel are balanced such that they are identical or differ by one bit. In some embodiments, a bit count of a virtual channel is based at least in part upon a total bit count of the two or more physical channels and a number buffers of the one or more buffers.

DETAILED DESCRIPTION

Figure 1A:
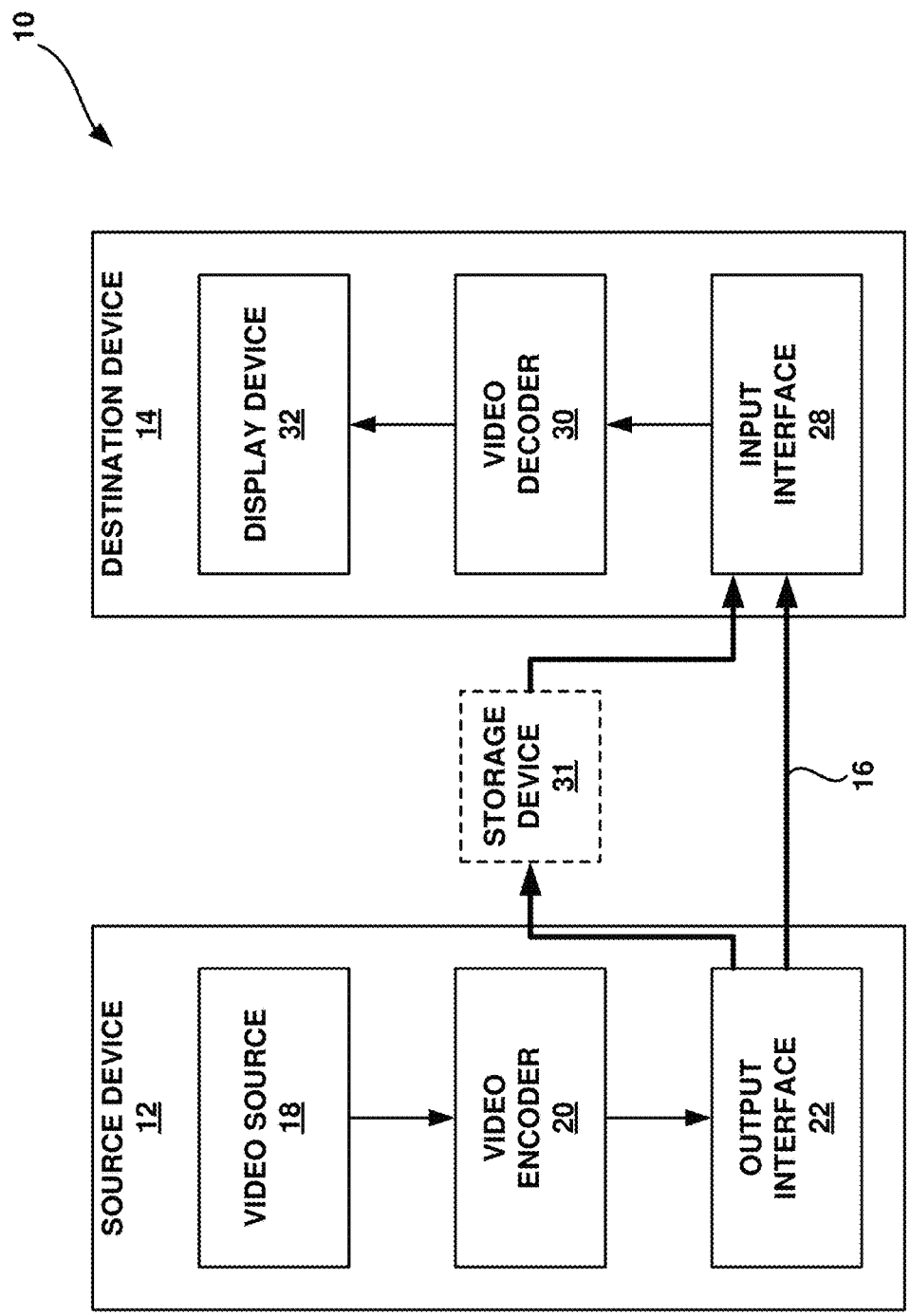
FIG. 1A is a block diagram illustrating an example video encoding and decoding system that may utilize techniques in accordance with aspects described in this disclosure.

In general, this disclosure relates to the use of palettes and sub-blocks in the context of advanced video codecs, such as High Efficiency Video Coding (HEVC). More specifically, the present disclosure relates to systems and methods for improved bit rate coding through the use of palettes and sub-blocks in the context of video coding.

Some embodiments may be implemented in the context of scalable video coding. Scalable video coding refers to video coding in which a base layer (BL), sometimes referred to as a reference layer (RL), and one or more scalable enhancement layers (ELs) are used. In scalable video coding, the BL can carry video data with a base level of quality. The one or more ELs can carry additional video data to support, for example, higher spatial, temporal, and/or signal-to-noise ratio (SNR) levels. ELs may be defined relative to a previously encoded layer. For example, a bottom layer may serve as a BL, while a top layer may serve as an EL. Middle layers may serve as either ELs or RLs, or both. For example, a middle layer (e.g., a layer that is neither the lowest layer nor the highest layer) may be an EL for the layers below the middle layer, such as the BL or any intervening ELs, and at the same time serve as an RL for one or more ELs above the middle layer. Similarly, in the multiview or 3D extension of the HEVC standard, there may be multiple views, and information of one view may be utilized to code (e.g., encode or decode) the information of another view (e.g., motion estimation, motion vector prediction and/or other redundancies).

In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards (e.g., including standards developed by International Telecommunication Union Telecommunication Standardization Sector [ITU-T] Video Coding Experts Group [VCEG] or International Organization for Standardization/International Electrotechnical Commission [ISO/IEC] Moving Pictures Experts Group [MPEG]): ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

HEVC generally follows the framework of previous video coding standards in many respects. The unit of prediction in HEVC is different from the units of prediction (e.g., macroblocks) in certain previous video coding standards. In fact, the concept of macroblock does not exist in HEVC as understood in certain previous video coding standards. A macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but HEVC does not restrict the maximum size of CUs and may allow recursive splitting into four equal size CUs to improve the content adaptivity. PU may be considered the basic unit of inter/intra prediction, and a single PU may contain multiple arbitrary shape partitions to effectively code irregular image patterns. TU may be considered the basic unit of transform. TU can be defined independently from the PU; however, the size of a TU may be limited to the size of the CU to which the TU belongs. This separation of the block structure into three different concepts may allow each unit to be optimized according to the respective role of the unit, which may result in improved coding efficiency.

For purposes of illustration only, certain embodiments disclosed herein are described with examples including only two layers (e.g., a lower layer such as a BL, and a higher layer such as an EL) of video data. A "layer" of video data may generally refer to a sequence of pictures having at least one common characteristic, such as a view, a frame rate, a resolution, or the like. For example, a layer may include video data associated with a particular view (e.g., perspective) of multiview video data. As another example, a layer may include video data associated with a particular layer of scalable video data. Thus, this disclosure may interchangeably refer to a layer and a view of video data. For example, a view of video data may be referred to as a layer of video data, and a layer of video data may be referred to as a view of video data. In addition, a multi-layer codec (also referred to as a multi-layer video coder or multi-layer encoder-decoder) may jointly refer to a multiview codec or a scalable codec (e.g., a codec configured to encode and/or decode video data using MV-HEVC, 3D-HEVC, SHVC, or another multi-layer coding technique). Video encoding and video decoding may both generally be referred to as video coding. It should be understood that such examples may be applicable to configurations including multiple BLs, RLs, and/or ELs. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the sheer quantity of information to be conveyed from an image encoder to an image decoder would render real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

In addition, a video coding standard, namely HEVC, is being developed by the Joint Collaboration Team on Video Coding (JCT-VC) of ITU-T VCEG and ISO/IEC MPEG. The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013. The multiview extension to HEVC, namely MV-HEVC, and the scalable extension to HEVC, named SHVC, are also being developed by the JCT-3V (ITU-T/ISO/IEC Joint Collaborative Team on 3D Video Coding Extension Development) and JCT-VC, respectively.

Video Coding System

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1A is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding. In addition to video encoders and video decoders, the aspects described in the present application may be extended to other related devices such as transcoders (e.g., devices that can decode a bitstream and re-encode another bitstream) and middleboxes (e.g., devices that can modify, transform, and/or otherwise manipulate a bitstream).

Figure 1B:
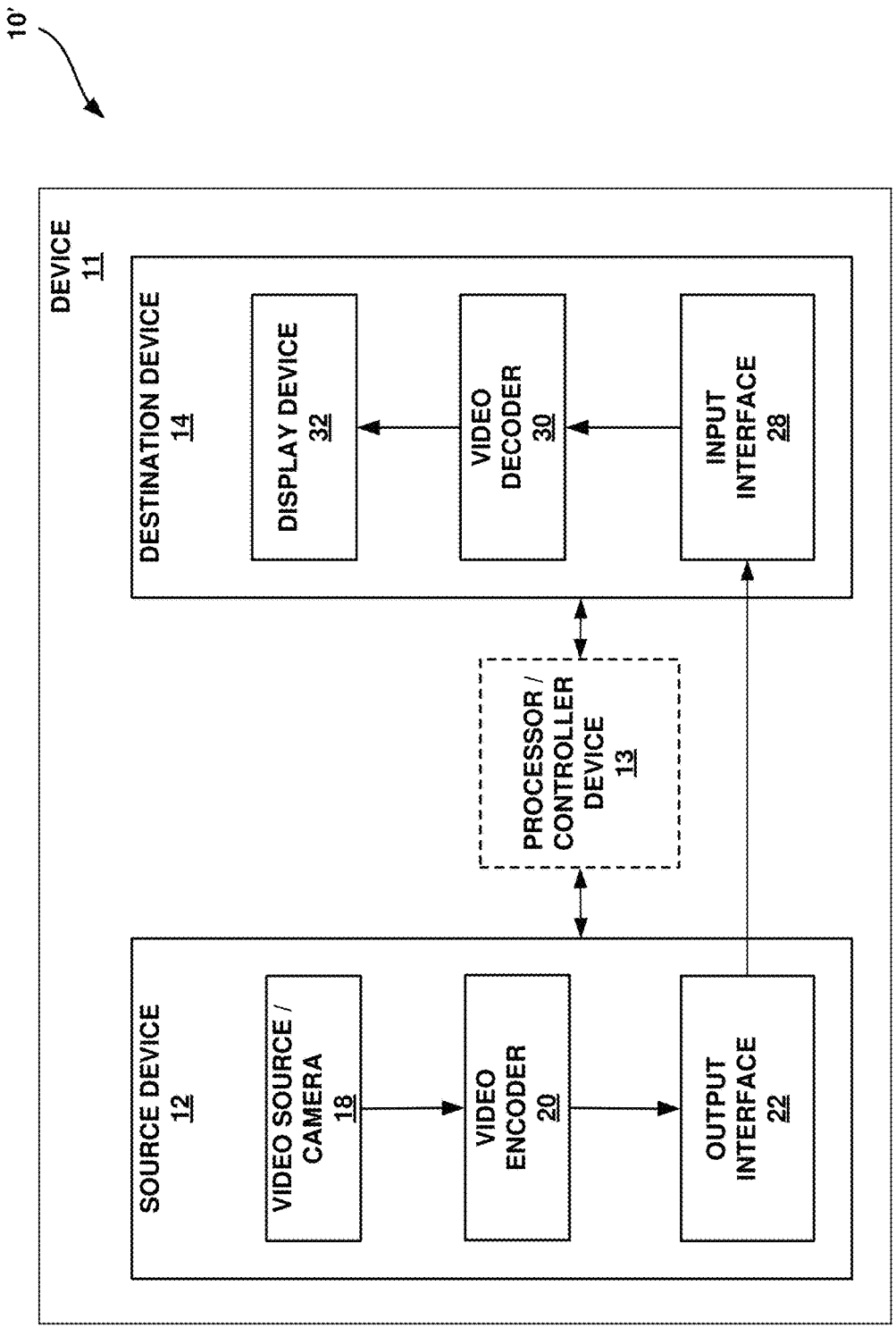
FIG. 1B is a block diagram illustrating another example video encoding and decoding system that may perform techniques in accordance with aspects described in this disclosure.

As shown in FIG. 1A, video coding system 10 includes a source device 12 that generates encoded video data to be decoded at a later time by a destination device 14. In the example of FIG. 1A, the source device 12 and destination device 14 are on separate devices—specifically, the source device 12 is part of a source device, and the destination device 14 is part of a destination device. It is noted, however, that the source and destination devices 12, 14 may be on or part of the same device, as shown in the example of FIG. 1B.

With reference once again, to FIG. 1A, the source device 12 and the destination device 14 may respectively comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In various embodiments, the source device 12 and the destination device 14 may be equipped for wireless communication.

The destination device 14 may receive, via a link 16, the encoded video data to be decoded. The link 16 may comprise any type of medium or device capable of moving the encoded video data from the source device 12 to the destination device 14. In the example of FIG. 1A, the link 16 may comprise a communication medium to enable the source device 12 to transmit encoded video data directly to the destination device 14 in real-time. The encoded video data may be modulated according to a communication standard, such as a wireless communication protocol, and transmitted to the destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

Alternatively, encoded data may be output from an output interface 22 to an optional storage device 31. Similarly, encoded data may be accessed from the storage device 31 by an input interface 28, for example, of the destination device 14. The storage device 31 may include any of a variety of distributed or locally accessed data storage media such as a hard drive, flash memory, volatile or non-volatile memory, or any other suitable digital storage media for storing encoded video data. In a further example, the storage device 31 may correspond to a file server or another intermediate storage device that may hold the encoded video generated by the source device 12. The destination device 14 may access stored video data from the storage device 31 via streaming or download. The file server may be any type of server capable of storing encoded video data and transmitting that encoded video data to the destination device 14. Example file servers include a web server (e.g., for a website), a File Transfer Protocol (FTP) server, network attached storage (NAS) devices, or a local disk drive. The destination device 14 may access the encoded video data through any standard data connection, including an Internet connection. This may include a wireless channel (e.g., a wireless local area network [WLAN] connection), a wired connection (e.g., a digital subscriber line (DSL), a cable modem, etc.), or a combination of both that is suitable for accessing encoded video data stored on a file server. The transmission of encoded video data from the storage device 31 may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over Hypertext Transfer Protocol (HTTP), Dynamic Adaptive Streaming over HTTP (DASH), and/or the like), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1A, the source device 12 includes a video source 18, a video encoder 20 and the output interface 22. In some cases, the output interface 22 may include a modulator/demodulator (modem) and/or a transmitter. In the source device 12, the video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones, as illustrated in the example of FIG. 1B. However, the techniques described in this disclosure may be applicable to video coding in general, and may be applied to wireless and/or wired applications.

The captured, pre-captured, or computer-generated video may be encoded by video encoder 20. The encoded video data may be transmitted directly to the destination device 14 via the output interface 22 of the source device 12. The encoded video data may also (or alternatively) be stored onto the storage device 31 for later access by the destination device 14 or other devices, for decoding and/or playback. Video encoder 20 illustrated in FIGS. 1A and 1B may comprise video encoder 20 illustrated FIG. 2A, video encoder 23 illustrated in FIG. 2B, or any other video encoder described herein.

In the example of FIG. 1A, the destination device 14 includes the input interface 28, a video decoder 30, and a display device 32. In some cases, the input interface 28 may include a receiver and/or a modem. The input interface 28 of the destination device 14 may receive the encoded video data over the link 16 and/or from the storage device 31. The encoded video data communicated over the link 16, or provided on the storage device 31, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server. Video decoder 30 illustrated in FIGS. 1A and 1B may comprise video decoder 30 illustrated FIG. 3A, video decoder 33 illustrated in FIG. 3B, or any other video decoder described herein.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In related aspects, FIG. 1B shows an example video encoding and decoding system 10' wherein the source and destination devices 12, 14 are on or part of a device 11. The device 11 may be a telephone handset, such as a "smart" phone or the like. The device 11 may include an optional processor/controller device 13 in operative communication with the source and destination devices 12, 14. The system 10' of FIG. 1B, and components thereof, are otherwise similar to the system 10 of FIG. 1A, and components thereof.

Video encoder 20 and video decoder 30 may operate according to a video compression standard, such as HEVC standard, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, AVC, or extensions of such standards. The techniques of this disclosure, however, are not limited to any particular coding standard. Other examples of video compression standards include MPEG-2 and ITU-T H.263.

Although not shown in the examples of FIGS. 1A and 1B, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (e.g., codec) in a respective device.

Video Coding Process

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include video parameter sets (VPSs), sequence parameter sets (SPSs), picture parameter sets (PPSs), adaptation parameter sets (APSs), and other syntax structures. An SPS may contain parameters applicable to zero or more sequences of pictures. A PPS may contain parameters applicable to zero or more pictures. An APS may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more CUs. Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (e.g., encode) the treeblocks in the slice according to a raster scan order. For example, video encoder 20 may encode the treeblocks of the slice in an order that proceeds from left to right across a topmost row of treeblocks in the slice, then from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

Video encoder 20 may perform encoding operations on (e.g., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

Video encoder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as context adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video Encoder

Figure 2A:
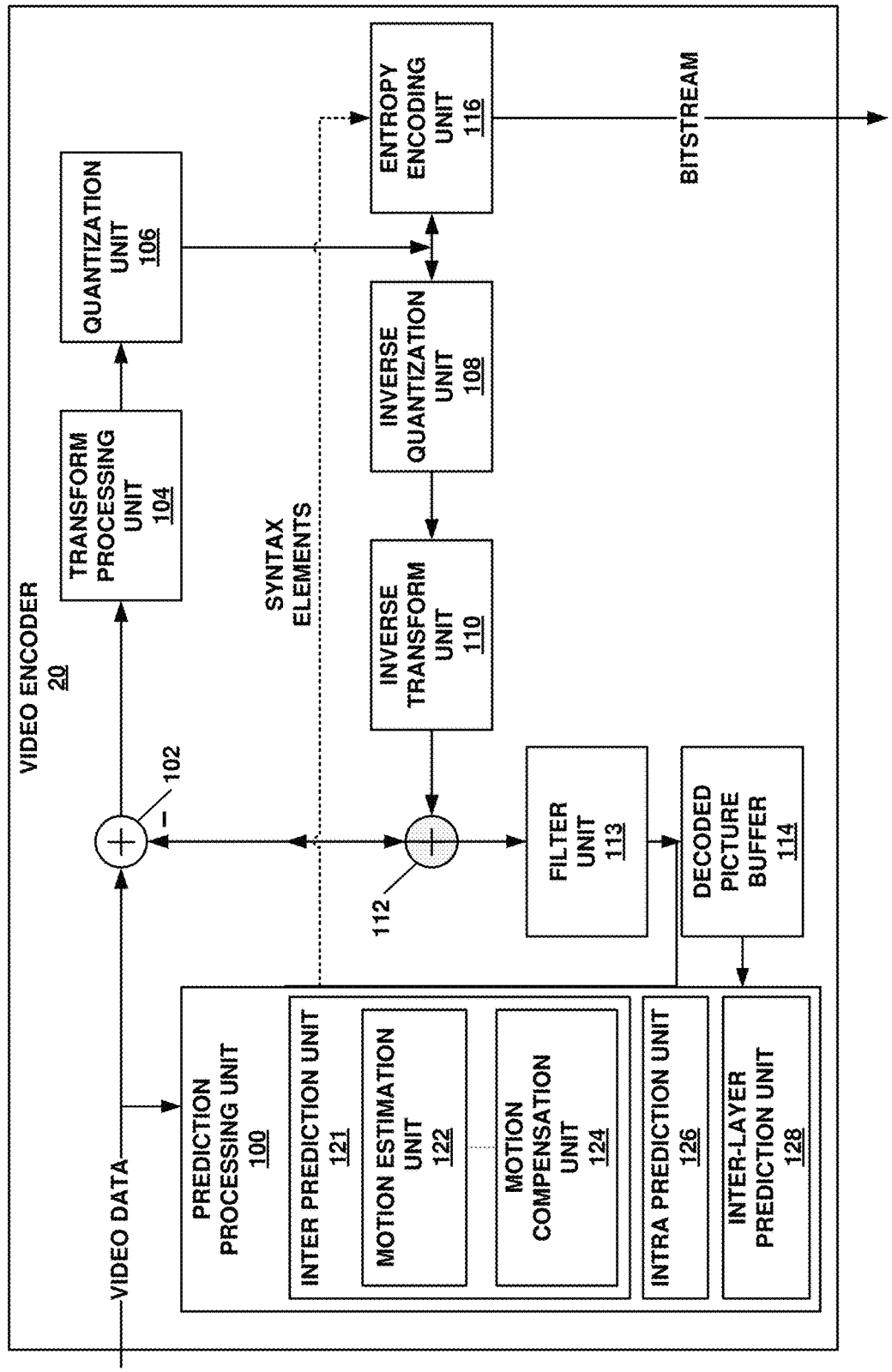
FIG. 2A is a block diagram illustrating an example of a video encoder that may implement techniques in accordance with aspects described in this disclosure.

FIG. 2A is a block diagram illustrating an example of a video encoder that may implement techniques in accordance with aspects described in this disclosure. Video encoder 20 may be configured to process a single layer of a video frame, such as for HEVC. Further, video encoder 20 may be configured to perform any or all of the techniques of this disclosure. As one example, prediction processing unit 100 may be configured to perform any or all of the techniques described in this disclosure. In another embodiment, video encoder 20 includes an optional inter-layer prediction unit 128 that is configured to perform any or all of the techniques described in this disclosure. In other embodiments, inter-layer prediction can be performed by prediction processing unit 100 (e.g., inter prediction unit 121 and/or intra prediction unit 126), in which case the inter-layer prediction unit 128 may be omitted. However, aspects of this disclosure are not so limited. In some examples, the techniques described in this disclosure may be shared among the various components of video encoder 20. In some examples, additionally or alternatively, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods. The example depicted in FIG. 2A is for a single layer codec. However, as will be described further with respect to FIG. 2B, some or all of video encoder 20 may be duplicated for processing of a multi-layer codec.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2A, video encoder 20 includes a plurality of functional components. The functional components of video encoder 20 include a prediction processing unit 100, a residual generation unit 102, a transform processing unit 104, a quantization unit 106, an inverse quantization unit 108, an inverse transform unit 110, a reconstruction unit 112, a filter unit 113, a decoded picture buffer 114, and an entropy encoding unit 116. Prediction processing unit 100 includes an inter prediction unit 121, a motion estimation unit 122, a motion compensation unit 124, an intra prediction unit 126, and an inter-layer prediction unit 128. In other examples, video encoder 20 may include more, fewer, or different functional components. Furthermore, motion estimation unit 122 and motion compensation unit 124 may be highly integrated, but are represented in the example of FIG. 2A separately for purposes of explanation.

Video encoder 20 may receive video data. Video encoder 20 may receive the video data from various sources. For example, video encoder 20 may receive the video data from video source 18 (e.g., shown in FIG. 1A or 1B) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction processing unit 100 may perform quadtree partitioning on the video block of the treeblock to divide the video block into progressively smaller video blocks. Each of the smaller video blocks may be associated with a different CU. For example, prediction processing unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction processing unit 100 may generate a hierarchical quadtree data structure for the treeblock. For example, a treeblock may correspond to a root node of the quadtree data structure. If prediction processing unit 100 partitions the video block of the treeblock into four sub-blocks, the root node has four child nodes in the quadtree data structure. Each of the child nodes corresponds to a CU associated with one of the sub-blocks. If prediction processing unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction processing unit 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction processing unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction processing unit 100 may select the prediction data for a PU from among the prediction data generated by motion compensation unit 124 for the PU or the prediction data generated by intra prediction unit 126 for the PU. In some examples, prediction processing unit 100 selects the prediction data for the PU based on rate/distortion metrics of the sets of prediction data.

If prediction processing unit 100 selects prediction data generated by intra prediction unit 126, prediction processing unit 100 may signal the intra prediction mode that was used to generate the prediction data for the PUs, e.g., the selected intra prediction mode. Prediction processing unit 100 may signal the selected intra prediction mode in various ways.

For example, it may be probable that the selected intra prediction mode is the same as the intra prediction mode of a neighboring PU. In other words, the intra prediction mode of the neighboring PU may be the most probable mode for the current PU. Thus, prediction processing unit 100 may generate a syntax element to indicate that the selected intra prediction mode is the same as the intra prediction mode of the neighboring PU.

As discussed above, video encoder 20 may include inter-layer prediction unit 128. Inter-layer prediction unit 128 is configured to predict a current block (e.g., a current block in the EL) using one or more different layers that are available in scalable video coding (e.g., a BL or RL). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the BL to predict the current block in the EL. Inter-layer motion prediction uses motion information of the BL to predict motion in the EL. Inter-layer residual prediction uses the residue of the BL to predict the residue of the EL. Each of the inter-layer prediction schemes is discussed below in greater detail.

After prediction processing unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction processing unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform processing unit 104 may generate one or more transform coefficient blocks for each TU of a CU by applying one or more transforms to a residual video block associated with the TU. Each of the transform coefficient blocks may be a 2D matrix of transform coefficients. Transform processing unit 104 may apply various transforms to the residual video block associated with a TU. For example, transform processing unit 104 may apply a discrete cosine transform (DCT), a directional transform, or a conceptually similar transform to the residual video block associated with a TU.

After transform processing unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction processing unit 100 to produce a reconstructed video block associated with a TU. By reconstructing video blocks for each TU of a CU in this way, video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of video encoder 20. For example, entropy encoding unit 116 may receive transform coefficient blocks from quantization unit 106 and may receive syntax elements from prediction processing unit 100. When entropy encoding unit 116 receives the data, entropy encoding unit 116 may perform one or more entropy encoding operations to generate entropy encoded data. For example, video encoder 20 may perform a CAVLC operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Multi-Layer Video Encoder

Figure 2B:
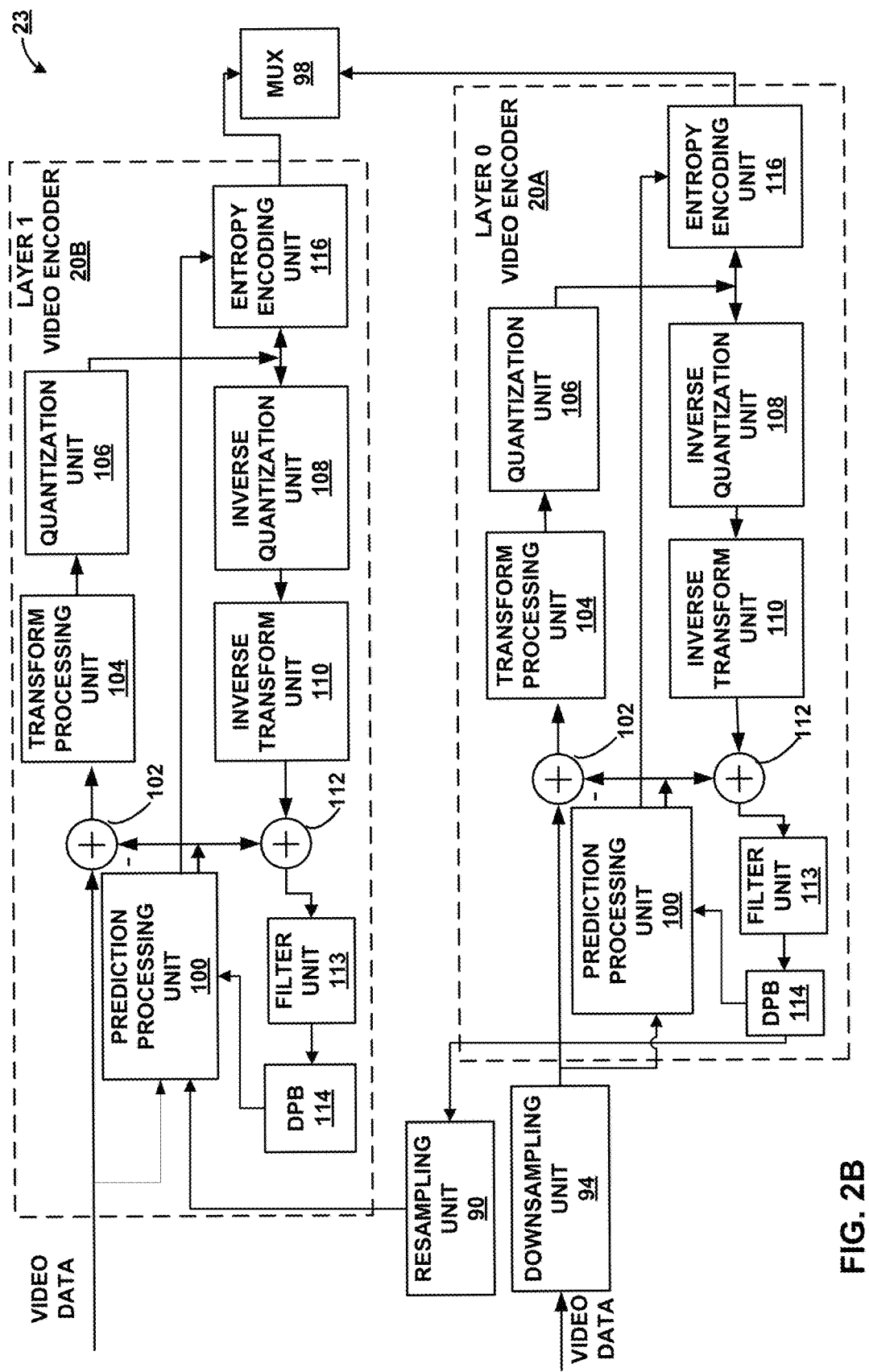
FIG. 2B is a block diagram illustrating an example of a video encoder that may implement techniques in accordance with aspects described in this disclosure.

FIG. 2B is a block diagram illustrating an example of a multi-layer video encoder 23 (also simply referred to as video encoder 23) that may implement techniques in accordance with aspects described in this disclosure. Video encoder 23 may be configured to process multi-layer video frames, such as for SHVC and multiview coding. Further, video encoder 23 may be configured to perform any or all of the techniques of this disclosure.

Video encoder 23 includes a video encoder 20A and video encoder 20B, each of which may be configured as video encoder 20 and may perform the functions described above with respect to video encoder 20. Further, as indicated by the reuse of reference numbers, video encoders 20A and 20B may include at least some of the systems and subsystems as video encoder 20. Although video encoder 23 is illustrated as including two video encoders 20A and 20B, video encoder 23 is not limited as such and may include any number of video encoder 20 layers. In some embodiments, video encoder 23 may include a video encoder 20 for each picture or frame in an access unit. For example, an access unit that includes five pictures may be processed or encoded by a video encoder that includes five encoder layers. In some embodiments, video encoder 23 may include more encoder layers than frames in an access unit. In some such cases, some of the video encoder layers may be inactive when processing some access units.

In addition to video encoders 20A and 20B, video encoder 23 may include a resampling unit 90. The resampling unit 90 may, in some cases, upsample a BL of a received video frame to, for example, create an EL. The resampling unit 90 may upsample particular information associated with the received BL of a frame, but not other information. For example, the resampling unit 90 may upsample the spatial size or number of pixels of the BL, but the number of slices or the picture order count may remain constant. In some cases, the resampling unit 90 may not process the received video and/or may be optional. For example, in some cases, the prediction processing unit 100 may perform upsampling. In some embodiments, the resampling unit 90 is configured to upsample a layer and reorganize, redefine, modify, or adjust one or more slices to comply with a set of slice boundary rules and/or raster scan rules. Although primarily described as upsampling a BL, or a lower layer in an access unit, in some cases, the resampling unit 90 may downsample a layer. For example, if during streaming of a video bandwidth is reduced, a frame may be downsampled instead of upsampled.

The resampling unit 90 may be configured to receive a picture or frame (or picture information associated with the picture) from the decoded picture buffer 114 of the lower layer encoder (e.g., video encoder 20A) and to upsample the picture (or the received picture information). This upsampled picture may then be provided to the prediction processing unit 100 of a higher layer encoder (e.g., video encoder 20B) configured to encode a picture in the same access unit as the lower layer encoder. In some cases, the higher layer encoder is one layer removed from the lower layer encoder. In other cases, there may be one or more higher layer encoders between the layer 0 video encoder and the layer 1 encoder of FIG. 2B.

In some cases, the resampling unit 90 may be omitted or bypassed. In such cases, the picture from the decoded picture buffer 114 of video encoder 20A may be provided directly, or at least without being provided to the resampling unit 90, to the prediction processing unit 100 of video encoder 20B. For example, if video data provided to video encoder 20B and the reference picture from the decoded picture buffer 114 of video encoder 20A are of the same size or resolution, the reference picture may be provided to video encoder 20B without any resampling.

In some embodiments, video encoder 23 downsamples video data to be provided to the lower layer encoder using the downsampling unit 94 before provided the video data to video encoder 20A. Alternatively, the downsampling unit 94 may be a resampling unit 90 capable of upsampling or downsampling the video data. In yet other embodiments, the downsampling unit 94 may be omitted.

As illustrated in FIG. 2B, video encoder 23 may further include a multiplexor 98, or mux. The mux 98 can output a combined bitstream from video encoder 23. The combined bitstream may be created by taking a bitstream from each of video encoders 20A and 20B and alternating which bitstream is output at a given time. While in some cases the bits from the two (or more in the case of more than two video encoder layers) bitstreams may be alternated one bit at a time, in many cases the bitstreams are combined differently. For example, the output bitstream may be created by alternating the selected bitstream one block at a time. In another example, the output bitstream may be created by outputting a non-1:1 ratio of blocks from each of video encoders 20A and 20B. For instance, two blocks may be output from video encoder 20B for each block output from video encoder 20A. In some embodiments, the output stream from the mux 98 may be preprogrammed. In other embodiments, the mux 98 may combine the bitstreams from video encoders 20A, 20B based on a control signal received from a system external to video encoder 23, such as from a processor on a source device including the source device 12. The control signal may be generated based on the resolution or bitrate of a video from the video source 18, based on a bandwidth of the link 16, based on a subscription associated with a user (e.g., a paid subscription versus a free subscription), or based on any other factor for determining a resolution output desired from video encoder 23.

Video Decoder

Figure 3A:
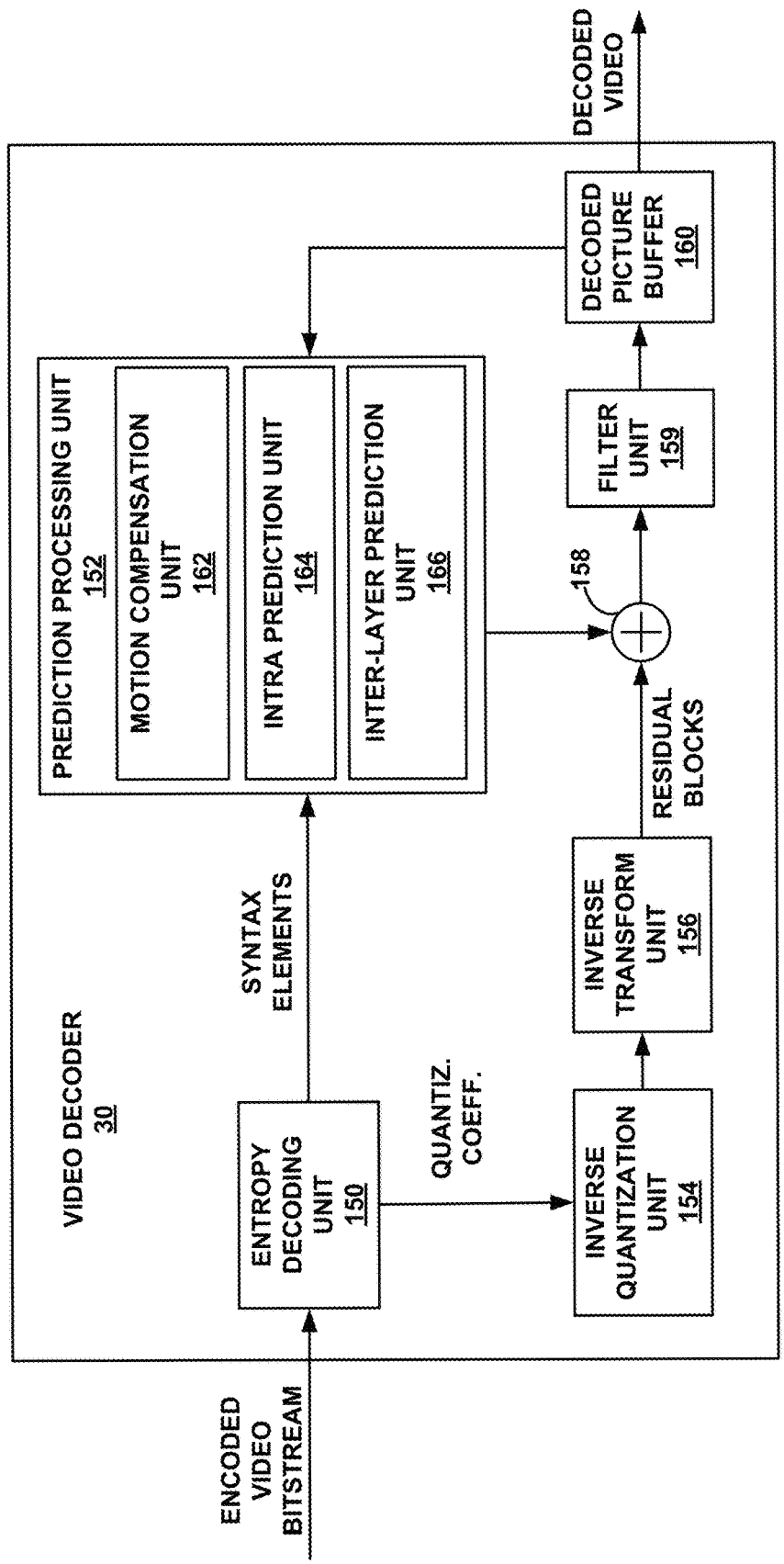
FIG. 3A is a block diagram illustrating an example of a video decoder that may implement techniques in accordance with aspects described in this disclosure.

FIG. 3A is a block diagram illustrating an example of a video decoder that may implement techniques in accordance with aspects described in this disclosure. Video decoder 30 may be configured to process a single layer of a video frame, such as for HEVC. Further, video decoder 30 may be configured to perform any or all of the techniques of this disclosure. As one example, motion compensation unit 162 and/or intra prediction unit 164 may be configured to perform any or all of the techniques described in this disclosure. In one embodiment, video decoder 30 may optionally include inter-layer prediction unit 166 that is configured to perform any or all of the techniques described in this disclosure. In other embodiments, inter-layer prediction can be performed by prediction processing unit 152 (e.g., motion compensation unit 162 and/or intra prediction unit 164), in which case the inter-layer prediction unit 166 may be omitted. However, aspects of this disclosure are not so limited. In some examples, the techniques described in this disclosure may be shared among the various components of video decoder 30. In some examples, additionally or alternatively, a processor (not shown) may be configured to perform any or all of the techniques described in this disclosure.

For purposes of explanation, this disclosure describes video decoder 30 in the context of HEVC coding. However, the techniques of this disclosure may be applicable to other coding standards or methods. The example depicted in FIG. 3A is for a single layer codec. However, as will be described further with respect to FIG. 3B, some or all of video decoder 30 may be duplicated for processing of a multi-layer codec.

In the example of FIG. 3A, video decoder 30 includes a plurality of functional components. The functional components of video decoder 30 include an entropy decoding unit 150, a prediction processing unit 152, an inverse quantization unit 154, an inverse transform unit 156, a reconstruction unit 158, a filter unit 159, and a decoded picture buffer 160. Prediction processing unit 152 includes a motion compensation unit 162, an intra prediction unit 164, and an inter-layer prediction unit 166. In some examples, video decoder 30 may perform a decoding pass generally reciprocal to the encoding pass described with respect to video encoder 20 of FIG. 2A. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction processing unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by video encoder 20 during generation of the predicted video block of the PU to calculate interpolated values for sub-integer samples of a reference block. Motion compensation unit 162 may determine the interpolation filters used by video encoder 20 according to received syntax information and use the interpolation filters to produce the predicted video block.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, video decoder 30 may also include inter-layer prediction unit 166. Inter-layer prediction unit 166 is configured to predict a current block (e.g., a current block in the EL) using one or more different layers that are available in scalable video coding (e.g., a BL or RL). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the BL to predict the current block in the EL. Inter-layer motion prediction uses motion information of the BL to predict motion in the EL. Inter-layer residual prediction uses the residue of the BL to predict the residue of the EL. Each of the inter-layer prediction schemes is discussed below in greater detail.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1A or 1B. For instance, video decoder 30 may perform, based on the video blocks in decoded picture buffer 160, intra prediction or inter prediction operations on PUs of other CUs.

Multi-Layer Decoder

Figure 3B:
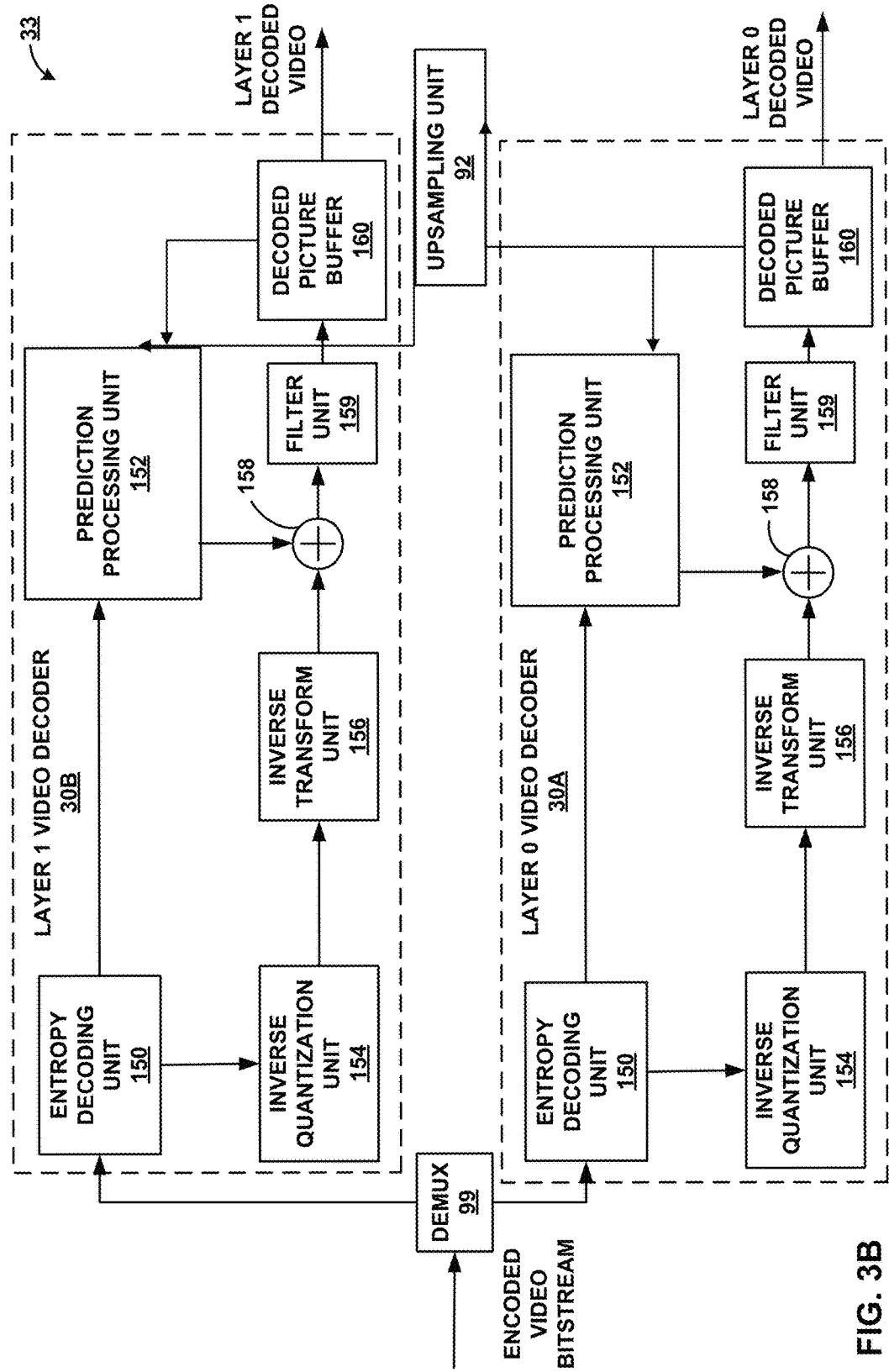
FIG. 3B is a block diagram illustrating an example of a video decoder that may implement techniques in accordance with aspects described in this disclosure.

FIG. 3B is a block diagram illustrating an example of a multi-layer video decoder 33 (also simply referred to as video decoder 33) that may implement techniques in accordance with aspects described in this disclosure. Video decoder 33 may be configured to process multi-layer video frames, such as for SHVC and multiview coding. Further, video decoder 33 may be configured to perform any or all of the techniques of this disclosure.

Video decoder 33 includes a video decoder 30A and video decoder 30B, each of which may be configured as video decoder 30 and may perform the functions described above with respect to video decoder 30. Further, as indicated by the reuse of reference numbers, video decoders 30A and 30B may include at least some of the systems and subsystems as video decoder 30. Although video decoder 33 is illustrated as including two video decoders 30A and 30B, video decoder 33 is not limited as such and may include any number of video decoder 30 layers. In some embodiments, video decoder 33 may include a video decoder 30 for each picture or frame in an access unit. For example, an access unit that includes five pictures may be processed or decoded by a video decoder that includes five decoder layers. In some embodiments, video decoder 33 may include more decoder layers than frames in an access unit. In some such cases, some of the video decoder layers may be inactive when processing some access units.

In addition to video decoders 30A and 30B, video decoder 33 may include an upsampling unit 92. In some embodiments, the upsampling unit 92 may upsample a BL of a received video frame to create an enhanced layer to be added to the reference picture list for the frame or access unit. This enhanced layer can be stored in the decoded picture buffer 160. In some embodiments, the upsampling unit 92 can include some or all of the embodiments described with respect to the resampling unit 90 of FIG. 2B. In some embodiments, the upsampling unit 92 is configured to upsample a layer and reorganize, redefine, modify, or adjust one or more slices to comply with a set of slice boundary rules and/or raster scan rules. In some cases, the upsampling unit 92 may be a resampling unit configured to upsample and/or downsample a layer of a received video frame The upsampling unit 92 may be configured to receive a picture or frame (or picture information associated with the picture) from the decoded picture buffer 160 of the lower layer decoder (e.g., video decoder 30A) and to upsample the picture (or the received picture information). This upsampled picture may then be provided to the prediction processing unit 152 of a higher layer decoder (e.g., video decoder 30B) configured to decode a picture in the same access unit as the lower layer decoder. In some cases, the higher layer decoder is one layer removed from the lower layer decoder. In other cases, there may be one or more higher layer decoders between the layer 0 decoder and the layer 1 decoder of FIG. 3B.

In some cases, the upsampling unit 92 may be omitted or bypassed. In such cases, the picture from the decoded picture buffer 160 of video decoder 30A may be provided directly, or at least without being provided to the upsampling unit 92, to the prediction processing unit 152 of video decoder 30B. For example, if video data provided to video decoder 30B and the reference picture from the decoded picture buffer 160 of video decoder 30A are of the same size or resolution, the reference picture may be provided to video decoder 30B without upsampling. Further, in some embodiments, the upsampling unit 92 may be a resampling unit 90 (see, e.g., FIG. 2B) configured to upsample or downsample a reference picture received from the decoded picture buffer 160 of video decoder 30A.

As illustrated in FIG. 3B, video decoder 33 may further include a demultiplexor 99, or demux. The demux 99 can split an encoded video bitstream into multiple bitstreams with each bitstream output by the demux 99 being provided to a different video decoder 30A and 30B. The multiple bitstreams may be created by receiving a bitstream and each of video decoders 30A and 30B receives a portion of the bitstream at a given time. While in some cases the bits from the bitstream received at the demux 99 may be alternated one bit at a time between each of video decoders (e.g., video decoders 30A and 30B in the example of FIG. 3B), in many cases the bitstream is divided differently. For example, the bitstream may be divided by alternating which video decoder receives the bitstream one block at a time. In another example, the bitstream may be divided by a non-1:1 ratio of blocks to each of video decoders 30A and 30B. For instance, two blocks may be provided to video decoder 30B for each block provided to video decoder 30A. In some embodiments, the division of the bitstream by the demux 99 may be preprogrammed. In other embodiments, the demux 99 may divide the bitstream based on a control signal received from a system external to video decoder 33, such as from a processor on a destination device including the destination device 14. The control signal may be generated based on the resolution or bitrate of a video from the input interface 28, based on a bandwidth of the link 16, based on a subscription associated with a user (e.g., a paid subscription versus a free subscription), or based on any other factor for determining a resolution obtainable by video decoder 33.

Video Pixel Line Buffers

Figure 4:
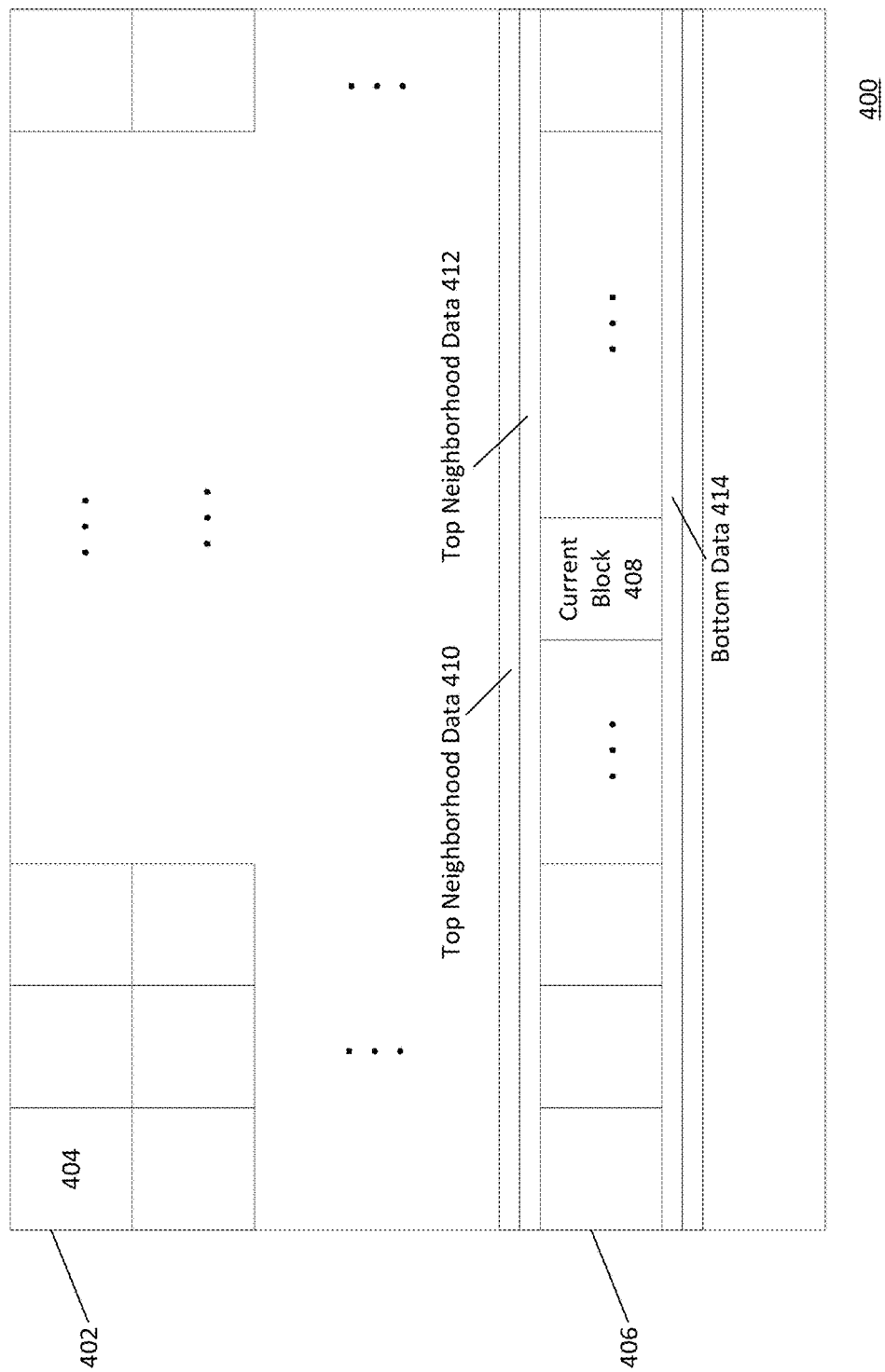
FIG. 4 illustrates a video frame, in accordance with some embodiments.

Video pixel line buffers are widely used for data processing in video codecs. In some embodiments, one or more data processing channels may be associated with corresponding channel based line buffers. For example, FIG. 4 illustrates a video frame, in accordance with some embodiments. As illustrated in FIG. 4, video frame 400 comprises a plurality of data blocks 404 arranged in a plurality of rows 402. In some embodiments, the neighborhood pixel data for a particular block or row may be used to process data for a next block or row. For example, top neighborhood data from a previously processed row of data blocks may be used to process a current block 408 in a row 406. In some embodiments, the top neighborhood data may comprise a first set of top neighborhood data 410 associated with a first channel, and a second set of top neighborhood data 412 associated with a second channel. When the current row 406 is processed, bottom neighborhood data 414 may be saved in a video pixel line buffer to be used as top neighborhood data in processing a subsequent row of data blocks.

Figure 5:
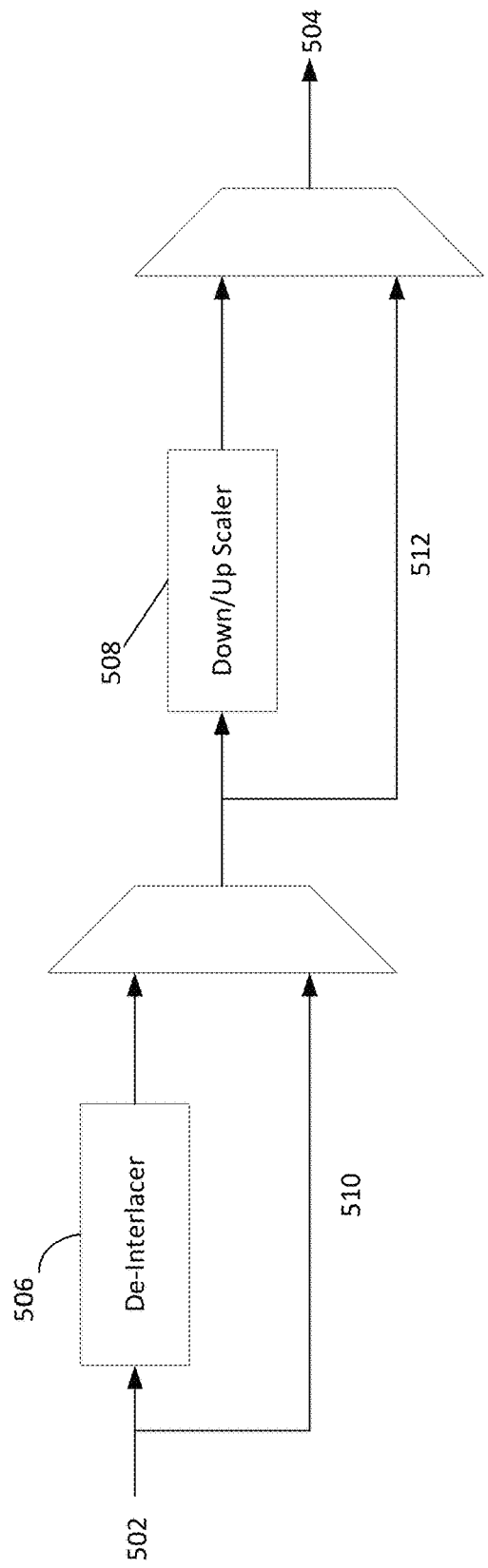
FIG. 5 illustrates a dual channel video processing system, in accordance with some embodiments.

FIG. 5 illustrates a dual channel video processing system, in accordance with some embodiments. Input video data 502 may be passed through a de-interlacer 506 and a down/up scaler 508 to produce output video data 504. Alternatively, the de-interlacer 506 and/or down/up scaler 508 may be bypassed (through paths 510 and 512 respectively). In some embodiments, the de-interlacer 506 may correspond to a first channel, while the down/up scaler 508 may correspond to a second channel (hereinafter also respectively referred to as "Channel A" and "Channel B"). For example, in some embodiments, Channel A may correspond to top line neighborhood data prior to de-interlacing (to be input into a de-interlacer), while Channel B may correspond to top line neighborhood data that has been de-interlaced but has not been scaled (to be input into a down/up scaler).

As such, in the illustrated embodiment, four different channel configurations are possible: a configuration where no channels are enabled (no de-interlacing or down/up scaling), a configuration where only Channel A is enabled (de-interlacing but no down/up scaling), a configuration where only Channel B is enabled (down/up scaling but no de-interlacing), and a configuration where both Channel A and Channel B are enabled (both de-interlacing and down/up scaling). Because a configuration where no channels are enabled would result in no data being buffered, only the last three configurations need be considered in the context of discussing video pixel line buffers.

Packing Data to DDR

In many applications, local memory may not have sufficient space to hold the data for the neighborhood pixels. As such, in some embodiments, neighborhood data may be sent to an external memory source, such as DDR (double data rate) memory. In some embodiments, in order to pack data from a channel (e.g., Channel A and/or Channel B) into a buffer implemented in DDR memory, a DMA (direct memory access) channel is used. As such, the data needs to be packed in a way that the DMA channel is able to recognize and process. When the data is needed (e.g., to process a next row of data blocks), the data may read back from the DDR through the DMA channel, where it may be unpacked and put in local memory where it may be used for processing. It is understood that while the present specification refers primarily to buffers implemented in DDR memory for the purpose of example, in other embodiments, buffers may be implemented in other types of memory, such as on-chip memory.

Figure 6:
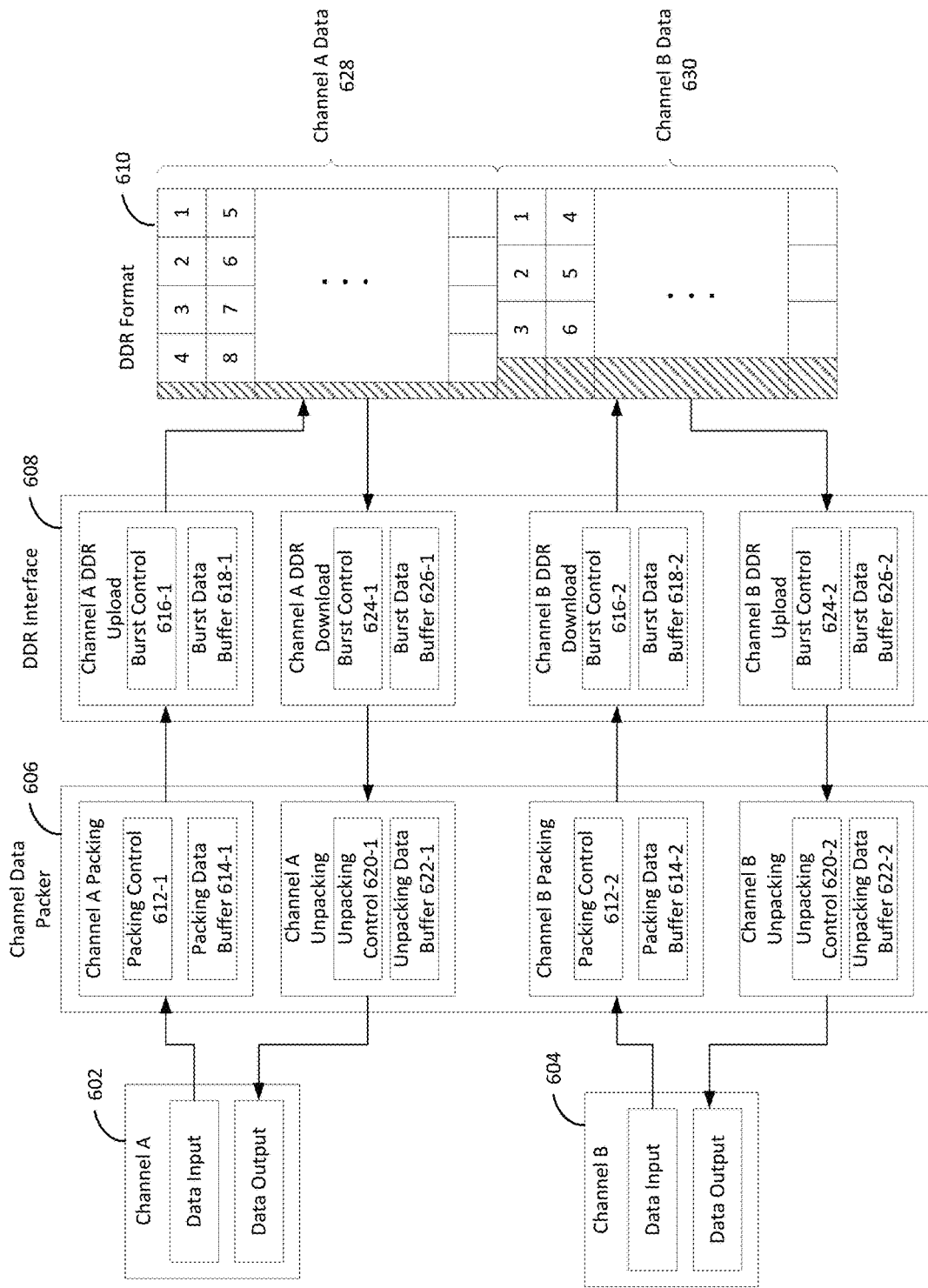
FIG. 6 illustrates a dual channel buffer packing scheme, in accordance with some embodiments.

FIG. 6 illustrates a dual channel buffer packing scheme, in accordance with some embodiments. In some embodiments, a packer 606 comprises a packing control module 612 (i.e., 612-1 and 612-2) that packs the received channel data into a packing buffer 614 (i.e., 614-1 and 614-2). A DDR interface 608 containing a burst control module 616 (i.e., 616-1 and 616-2) then stores the data into burst data buffer 618 (i.e., 618-1 and 618-2), where it may then be uploaded to the DDR 610. Similarly, in order to unpack data from the DDR 610, the data from the DDR is saved in a burst data buffer 626 (i.e., 626-1 and 626-2) at the DDR interface 608 by a burst control module 624 (i.e., 624-1 and 624-2), and then moved to an unpacking data buffer 622 (i.e., 622-1 and 622-2) for unpacking by an unpacking control module 620 (i.e., 620-1 and 620-2), where it may be output to local memory for use in processing. In some embodiments, other types of modules may be used to pack/unpack the channel data.

In some embodiments, the DDR buffer is configured to store a plurality of words, wherein each word comprises a sequence containing a set number of bits. In some embodiments, the burst data buffer 618 is configured to be the same size as a word. For example, data blocks from the first or second channels may be packed into the burst data buffer until the burst data buffer is unable to fit a next data block to be buffered, whereupon the data from the burst data buffer is stored in the DDR buffer as a new word.

As illustrated in FIG. 6, each channel (Channel A 602 and Channel B 604) is associated with its own packing/unpacking hardware, and may be packed and unpacked independently. For example, in order to upload data to the DDR, Channel A 602 may be associated with a first packing module (comprising a packing control 612-1 and a packing data buffer 614-1) and a first DDR upload module (comprising a burst control module 616-1 and burst data buffer 618-1), while Channel B 604 may be associated with a second packing module (comprising a packing control 612-2 and a packing data buffer 614-2) and a second DDR upload module (comprising a burst control module 616-2 and burst data buffer 618-2). Similarly, in order to download data from the DDR, Channel A may use its own DDR download module (comprising a burst control module 624-1 and a burst data buffer 626-1) and unpacking module (comprising an unpacking control module 620-1 and unpacking data buffer 622-1), while Channel B is also associated with its own DDR download module (comprising a burst control module 624-2 and a burst data buffer 626-2) and unpacking module (comprising an unpacking control module 620-2 and unpacking data buffer 622-2). In addition, the DDR memory 610 may be divided into separate a plurality of different partitions (e.g., memory slots) corresponding to each channel. For example, Channel A data and Channel B data may be respectively assigned to a Channel A partition 628 and a Channel B partition 630. As such, data blocks from Channel A and data blocks from Channel B will be stored in separate words in separate buffers.

Figure 7A:
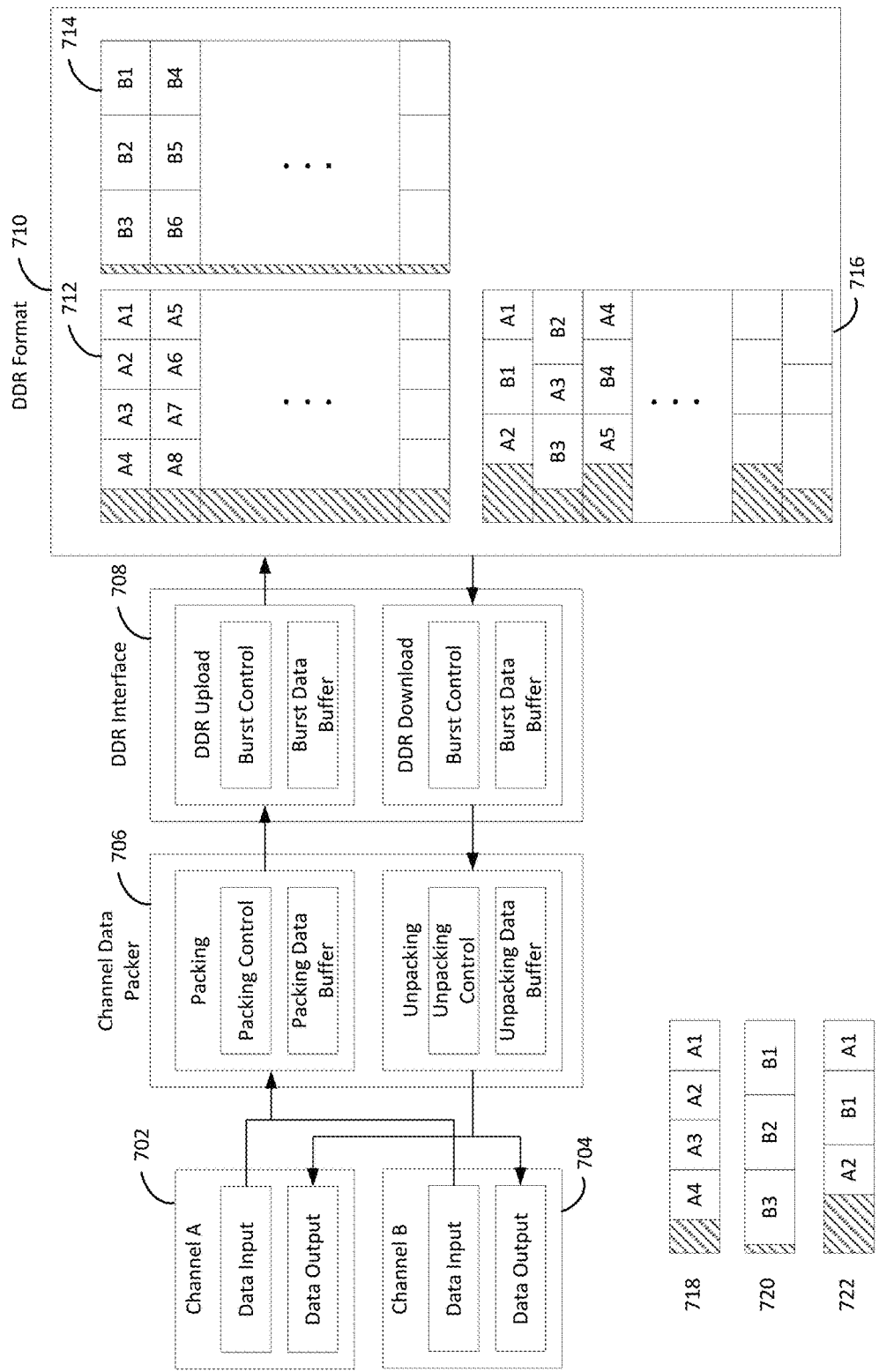
FIG. 7A illustrates a dual channel buffer packing scheme where the two channels share packing/unpacking and DDR upload/download modules, in accordance with some embodiments

Having each channel be associated with its own individual hardware requires a large amount of redundant hardware. In some embodiments, in order to reduce realization costs, instead of requiring a separate packing/unpacking and DDR upload/download modules for each channel, a mixed packing scheme may be used, wherein two channels may be packed and unpacked jointly. As such, the two channels will only need one set of packer/unpacker modules and DDR upload/download modules, reducing the number of modules needed by half. FIG. 7A illustrates a dual channel buffer packing scheme where the two channels share packing/unpacking and DDR upload/download modules, in accordance with some embodiments.

As illustrated in the figure, the first and second channels (Channel A 702 and Channel B 704) share the same packing/unpacking modules 706 and DDR upload/download modules 708 for packing data to DDR memory 710. In addition, as data from Channels A and B are processed through the same packing/unpacking and upload/download modules, they may be stored in the same partition of the DDR. If only Channel A is enabled, then the data may be stored in a format as illustrated at 712, where each word of the buffer only contains data blocks from Channel A. If only Channel B is enabled, the data may be stored in a format as illustrated at 714, where each word of the buffer only contains data blocks from Channel B. If both Channels A and B are enables, the data may be stored in a format as illustrated at 716, where each word of the buffer may contain data blocks from both Channel A and Channel B. In some embodiments, the data blocks from the two channels are packed in an alternating pattern (e.g., a block from Channel A is packed, followed by a block from Channel B, followed by another block from Channel A, and so forth). In some embodiments, each word may comprise zero or more unused bits (also referred to as junk bits). The junk bits may be located on a side of the word opposite the side of the word from which the data blocks are packed. For example, in the illustrated embodiments, the data blocks are packed from the right side of the word, and the junk bits are located on the left side of the word.

As such, four different possible packing formats are needed packing data blocks from the channels to the DDR. For example, the packing formats may comprise a first packing format 718 where only data blocks from Channel A are packed, a second packing format 720 where only data blocks from Channel B are packed, a third packing format 722 where data blocks from Channel A and Channel B are packed in an alternating pattern starting with a data block from Channel A, and a fourth packing format 724 where data blocks from Channel A and Channel B are packed in an alternating pattern starting with data block from Channel B. Thus, how the data blocks are packed and/or unpacked will depend upon which of the four different packing formats is currently being used.

Figure 8A:
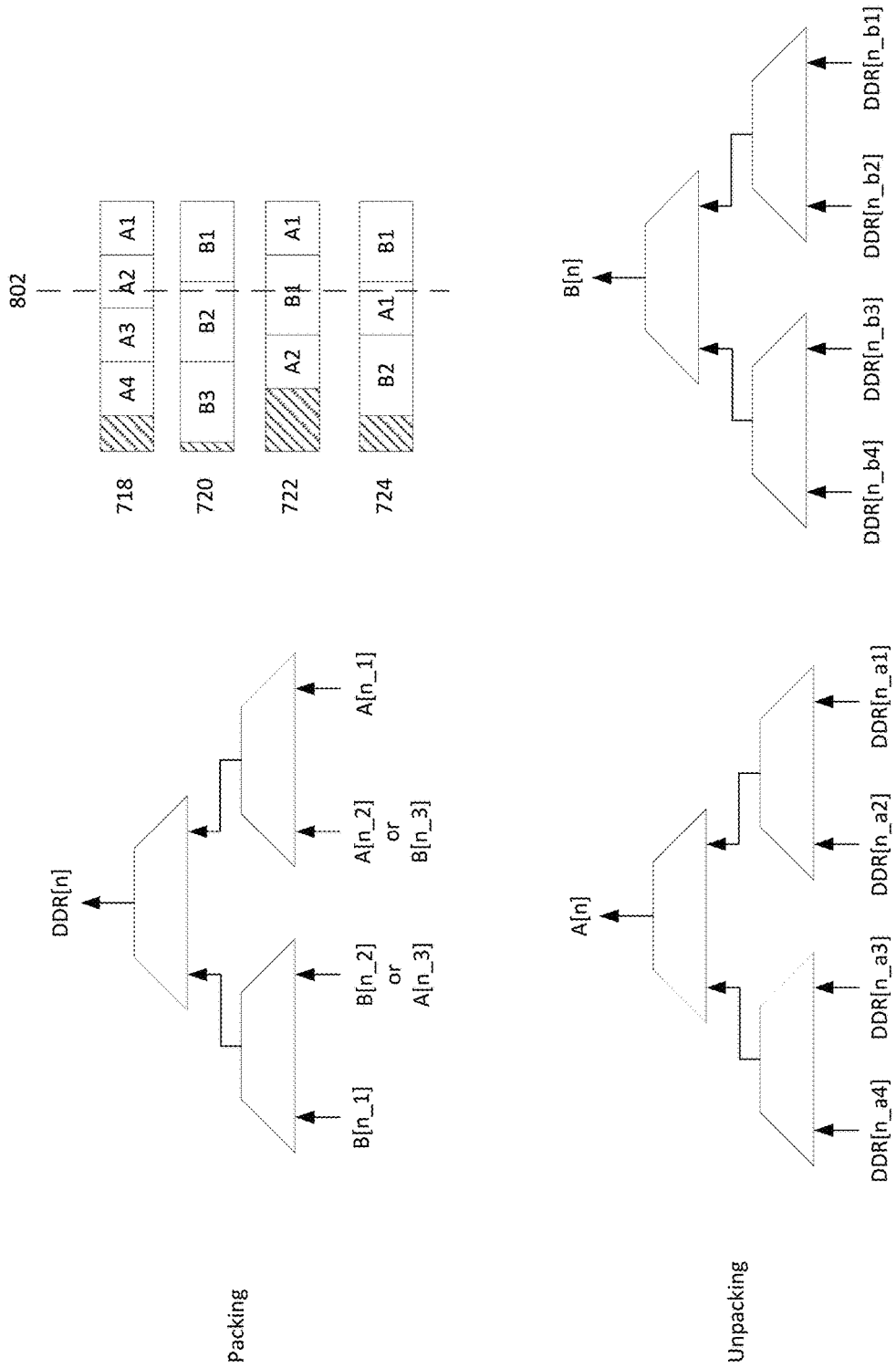
FIG. 8A illustrates a gate configuration that may be used to pack and unpack data blocks to and from a DDR buffer, in accordance with some embodiments.

For example, FIG. 8A illustrates a gate configuration that may be used to pack and unpack data blocks to and from a DDR buffer, in accordance with some embodiments. Because there are four different possible packing formats, a 4-to-1 MUX may be used to determine the data that is packed to the buffer, as well as the data that is unpacked in each channel during data retrieval. In some embodiments, three 2-to-1 MUXs may be used to implement a 4-to-1 MUX. In the illustrated embodiment, packing an nth bit to the DDR (DDR[n]) involves selecting between a bit from Channel B (B[n_1]), a bit from Channel A (A[n_1]), or a bit from a later block of Channel A or B (B[n_2] or A[n_3], or A[n_2] or B[n_3], which may be based at least in part upon a value of n and/or the block sizes of Channels A and B relative to each other). For example, with reference to the patterns illustrated in FIG. 7A, a bit at a location of the word corresponding to line 802 may be selected from one of four block from Channels A and B (e.g., from block A2, B2, B1, and A1, corresponding to patterns 718, 720, 722, and 724, respectively). Similarly, when unpacking data to Channels A and B, four different possible selections may be made, based upon the packing format used (e.g., an nth bit for Channel A (A[n]) may be selected from DDR[n_a1], DDR[n_a2], DDR[n_a3], and DDR[n_a4], each corresponding to a different packing format).

Low Complexity/Low Cost Dual-Channel Packing

Figure 7B:
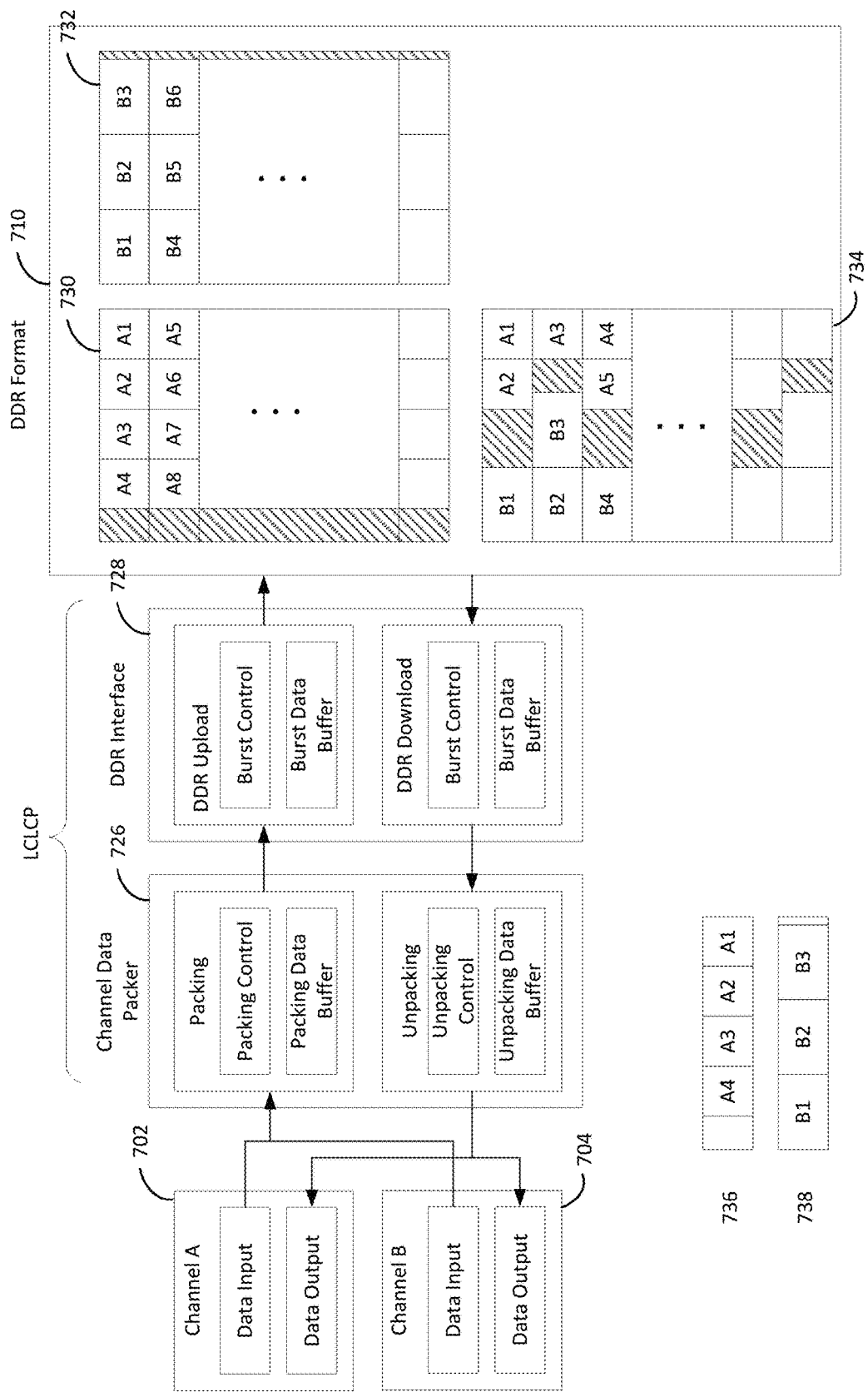
FIG. 7B illustrates a data packing scheme that packs data blocks from the first and second channels in opposite directions, in accordance with some embodiments.

In some embodiments, in order to reduce the hardware requirements and complexity of the packing and unpacking of data blocks, data blocks from the two channels, instead of being packed in an alternating pattern from the same direction (e.g., from right to left, as illustrated in FIG. 7A), may be packed in opposite directions. FIG. 7B illustrates a data packing scheme that packs data blocks from the first and second channels in opposite directions, in accordance with some embodiments. In some embodiments, the packer/unpacker module 726 and DDR interface 728 used for packing the data blocks in this arrangement may be referred to collectively as a Low Complexity/Low Cost Dual-Channel Packer (LCLCP).

As illustrated in the figure, data blocks from Channel A may be packed in a first direction from a first side of a word towards a second side of the word (e.g., from right to left), while data blocks from Channel B may be packed in a second direction from the second side of the word towards the first side (e.g., from left to right). As such, if only Channel A is enabled, then the data may be stored in a format as illustrated at 730, where each word of the buffer only contains data blocks from Channel A packed right to left. If only Channel B is enabled, then the data may be stored in a format as illustrated at 732, where each word of the buffer only contains data blocks from Channel B packed left to right. If both Channel A and Channel B are enabled, the data may be stored in a format as illustrated at 734, wherein data blocks from Channel A are packed from the right side of the word, and data blocks from Channel B are packed from the left side of the word, with zero or more junk bits between the data blocks from Channel A and Channel B. In some embodiments, when both Channel A and Channel B are enabled, the data blocks for the two channels are packed in an alternating or interleaving pattern (e.g., a block from Channel A is packed, followed by a block from Channel B, followed by another block from Channel A, and so forth).

Because data blocks from Channel A are always packed in the first direction and data blocks from Channel B are always backed in the second direction, data blocks from Channel A and Channel B are never interleaved in the packed word. When packing a data block from Channel A into a word, there is no need to check whether or not the word also contains data blocks from Channel B, so long as there are enough unused bits left in the word to accommodate the data block.

As a result, only two different packing formats are needed (e.g., a first packing format 736 wherein data blocks from Channel A are packed in the first direction, and a second packing format 738 wherein data blocks from Channel B are packed in the second direction). In addition, because data blocks from the first and second channels are not interleaved when packed in the word, when unpacking data blocks from a particular channel, each word of the buffer may be read by reading the bits of the word in the direction corresponding to the channel until a junk bit or a bit from a data block of the other channel is reached.

Figure 8B:
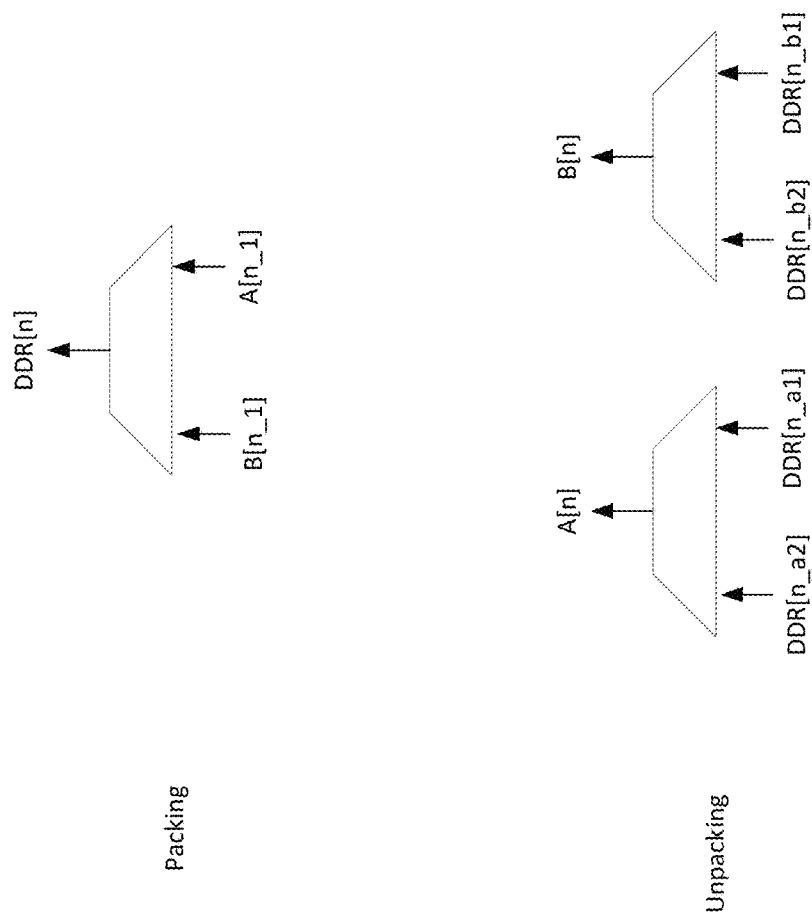
FIG. 8B illustrates a gate configuration that may be used to pack and unpack data blocks to and from a DDR buffer using a Low Complexity/Low Cost Dual-Channel packing arrangement, in accordance with some embodiments.

FIG. 8B illustrates a gate configuration that may be used to pack and unpack data blocks to and from a DDR buffer, in accordance with some embodiments. Because only two formats are used instead of four, the number and complexity of MUXs required in order to pack and unpack the data blocks is greatly reduced. For example, instead of requiring a 4-to-1 MUX (or three 2-to-1 MUXs) for packing data blocks from the channels to the DDR, a single 2-to-1 MUX may be used. For example, in the illustrated embodiment, packing an nth bit to be packed into the DDR (DDR[n]) involves selecting between a bit from Channel A and a bit from Channel B (A[n_1] and B[n_1]). Similarly, when unpacking data to Channels A and B, two different possible selections may be made for each channel, based upon the packing format used (e.g., an nth bit for Channel A (A[n]) may be selected from DDR[n_a1] and DDR[n_a2], each corresponding to a different packing format).

Figure 9A:
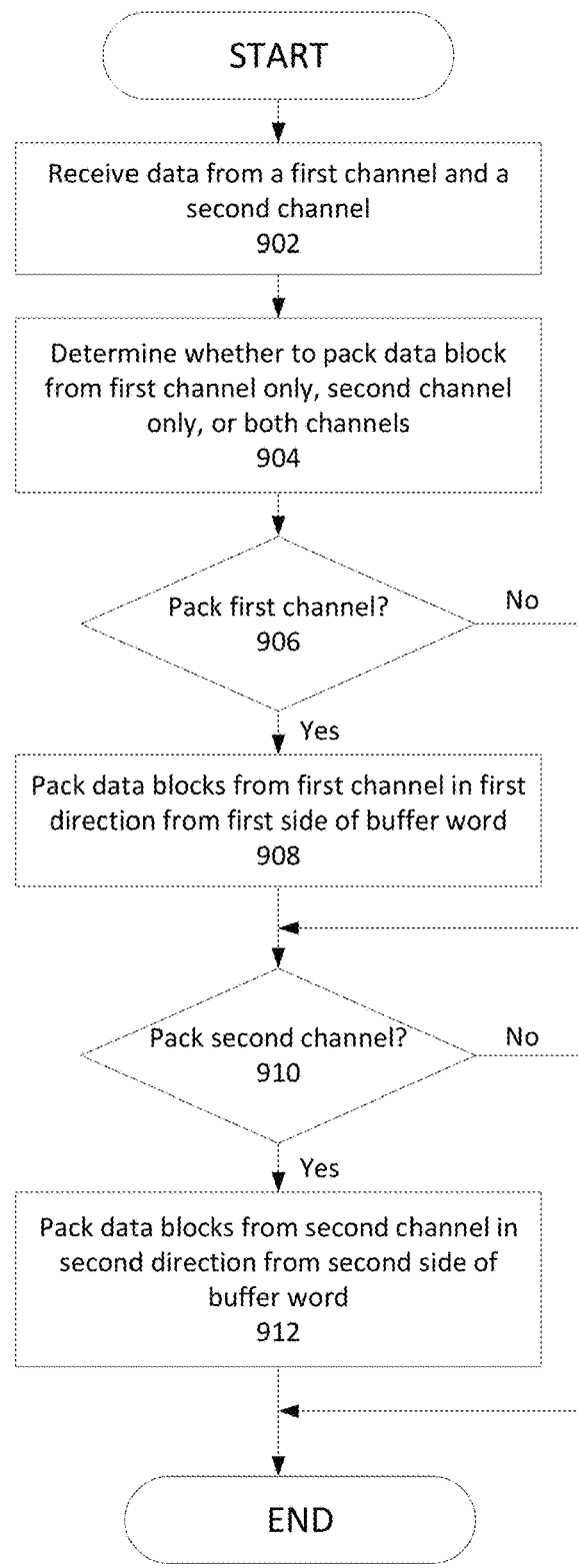
FIG. 9A illustrates a flowchart of a process for packing channel data to a DDR buffer, in accordance with some embodiments.

FIG. 9A illustrates a flowchart of a process for packing channel data to a DDR buffer, in accordance with some embodiments. At block 902, data blocks are received from a first channel and a second channel. In some embodiments, the first and second channels may correspond to different manipulations of video data. For example, the first channel may correspond to a de-interlacer, while the second channel may correspond to a down/up scaler.

At block 904, a determination may be made as to whether to pack only data blocks from the first channel, only data blocks from the second channel, or data blocks from both channels. For example, in some embodiments, a de-interlacer and/or down/up scaler may be bypassed, resulting in no need to buffer data from the de-interlacer and/or down/up scaler. In some embodiments, the buffer to which the data blocks are to packed may be associated with a DDR or other type of memory. The buffer may be configured to store a plurality of words, wherein each word comprises a series of bits extending between a first bit at a first side of the word to a last bit at a second side of the word.

If it is determined that data blocks from the first channel are to be packed (block 906), then at block 908, data blocks from the first channel are packed in a first direction from a first side of the word towards a second side of the word. If it is determined that data blocks from the second channel are to be packed (block 910), then at block 912, data blocks from the second channels are packed in a second direction from the second side of the words towards the first side of the word.

As such, data blocks from the first and second data channels will be packed in opposite directions. Each word of the buffer, when packed, may contain one or more data blocks from the first channel on the first side of the word, and one or more data blocks from the second channel on the second side of the word, with zero or more bits of unused data in between the data blocks of the first channel and the data blocks of the second channel. In order to unpack the data blocks, data blocks from the first channel may be read from the first side of the word, while data blocks from the second channel from the second side of the word.

Figure 9B:
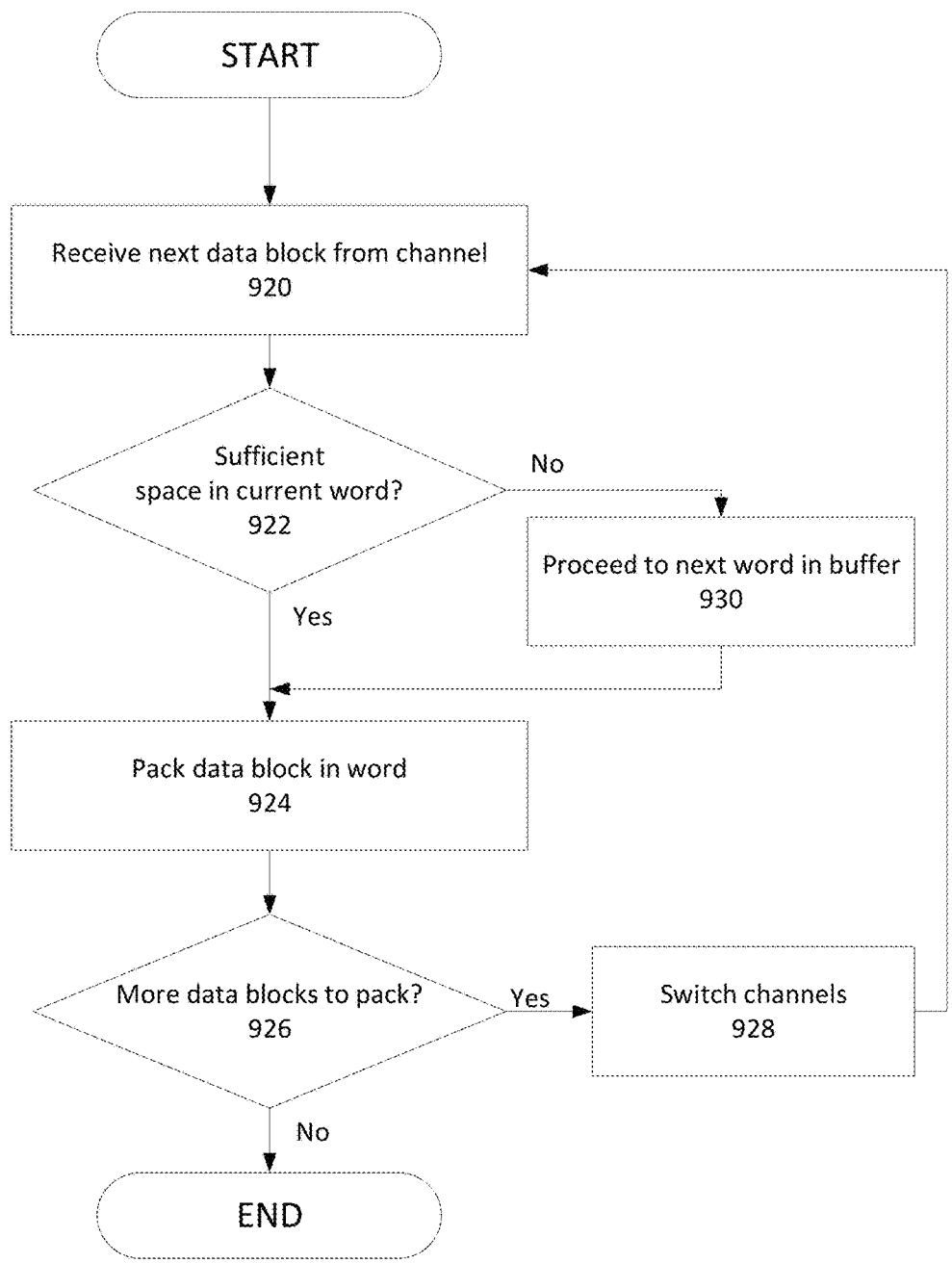
FIG. 9B illustrates a flowchart of a method for packing data blocks, in accordance with some embodiments.

In some embodiments, data blocks from the first and second channels are packed in an alternating or interleaved pattern. FIG. 9B illustrates a flowchart of a method for packing data blocks, in accordance with some embodiments. At block 920, a data block to be packed is received from a channel (e.g., the first channel).

At block 922, a determination is made as to whether there is still sufficient space in the current word in the buffer to store the data block. If so, then at block 924, the data block is packed into the word. In some embodiments, the data block may be packed on a side of the free space within the word that is associated with the channel. For example, if the data block is from the first channel, then it may be packed towards the first side of the word. On the other hand, if the data block is from the second channel, it may be packed towards the second side of the word.

On the other hand, if the current word does not have enough space to store the data block, then at block 930, a next word in the buffer is selected. The data block may then be packed into the next word at block 924.

At block 926, a determination is made as to whether or not there are additional data blocks to be packed. If so, then at block 928, the channel is switched (e.g., from the first channel to the second channel, or vice versa) such that a data block from the other channel will be packed next, and the process may loop back to block 920.

Channel Balancing with Virtual Channels

In some embodiments, if there is a large difference between the block sizes of the first and second channels, packing data blocks from the channels may be inefficient and result in a large number of unused or junk bits in each word.

In addition, in some embodiments, more than two channels may be used. In some embodiments, if there are more than two channels containing data blocks to be packed to a DDR buffer, the channels may be associated with a plurality of packers. For example, a plurality of packers may be used, wherein each packer packs two data blocks from channels into words to be stored in the buffer.

In addition, in some embodiments having more than two channels, if the block size of a channel is much larger than that of another channel, blocking may occur. As data is unpacked from the DDR through the DMA path, data from channels having a large block size may come very fast and block data from channels with smaller block sizes. As a result, it is often beneficial to be able to synchronize the block sizes of different channels in order to reduce blocking.

For example, in a particular embodiments, a first packer may be used to pack data blocks from a first channel and a second channel (e.g., Channel A and Channel B), while a second packer may pack data blocks from a third channel (e.g., Channel C). Channels A and B may have a block size of 8 bits per block, while Channel C may have a block size of 2 bits per block. As words are only output to the DDR from the packer when they are filled, using a word size of 32 bits, data from Channels A and B may each be output after 4 blocks, data from Channel C can only be output after 16 blocks. As such, the DDR will contain four words of Channel A and B data for each word of Channel C data. For example, the DDR may store four words of Channel A and B data followed by a word of Channel C data. When data is read back from the DDR, the first word may be read to obtain Channel A and B data. However, because there are three additional words of Channel A and B data before the word for Channel C data, the data for Channel C cannot be read and is blocked until the blocks of Channel A and B data before it are read.

Figures 10A, 10B:
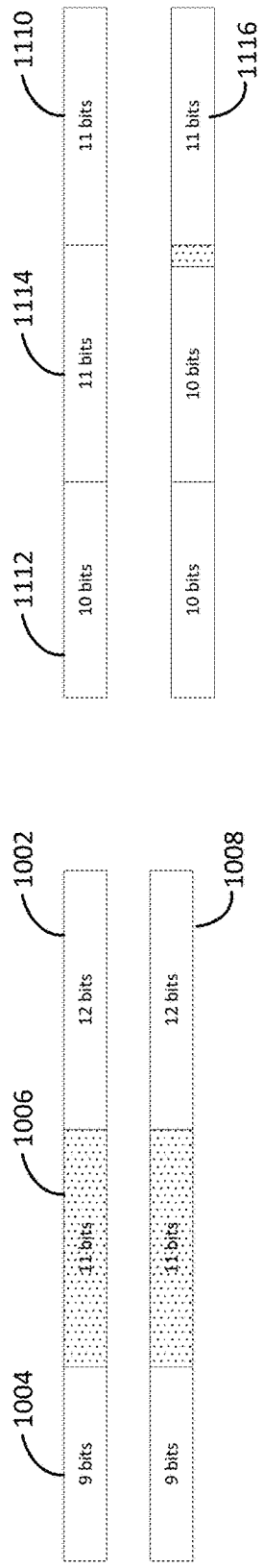
FIG. 10A illustrates packing data blocks from a first and second channel wherein the first and second channels are unbalanced, in accordance with some embodiments.
FIG. 10B illustrates packing data blocks from first and second channels wherein the first and second channels are balanced, in accordance with some embodiments.

In some embodiments, a large difference between the block size of the first channel and the block size of the second channel (may also be referred as the first and second channels being "unbalanced") may lead to a large amount of unused bits in each word of the buffer. For example, FIG. 10A illustrates packing data blocks from a first and second channel wherein the first and second channels are unbalanced, in accordance with some embodiments. In the illustrated embodiment, Channel A has a block size of 12 bits, while Channel B has a block size of 9 bits. In some embodiments, when packing the data blocks from Channels A and B, a block 1002 from Channel A may be packed first from a first end (e.g., the right side) of a word in the buffer. Next, a block 1004 from Channel B is packed from a second end (e.g., left side) of the word. The packer may then attempt to pack another block from Channel A into the word, but will be unable to because due to insufficient remaining space in the word (11 bits) to accommodate the block (12 bits). Instead, the packer packs the block into a next word in the DDR at 1008. As a result, each word in the DDR will have 11 bits of unused junk bits 1006.

On the other hand, if the block sizes of the first and second channels are close in size (may also be referred as being "balanced"), the amount of junk bits may be greatly reduced. For example, FIG. 10B illustrates packing data blocks from first and second channels wherein the first and second channels are balanced, in accordance with some embodiments. In the illustrated embodiment, Channel A has a block size of 11 bits, while Channel B has a block size of 10 bits. In this configuration, the packer is able to pack a first data block 1110 from Channel A, a first data block 1112 from Channel B, and a second data block 1114 from Channel A before the word runs out of space for packing an additional data block. The pack may subsequently pack a second data block 1116 from Channel B in a subsequent word, followed by a third data block from Channel A, a third data block from Channel B, and so forth. As such, the number of unused junk bits for every two words of the DDR is only 1 bit, compared to 22 bits for the embodiment illustrated in FIG. 10A. As such, if the channels are balanced, data blocks from the channels may be packed more efficiently in a DDR buffer, with fewer words being needed.

Figures 11A, 11B:
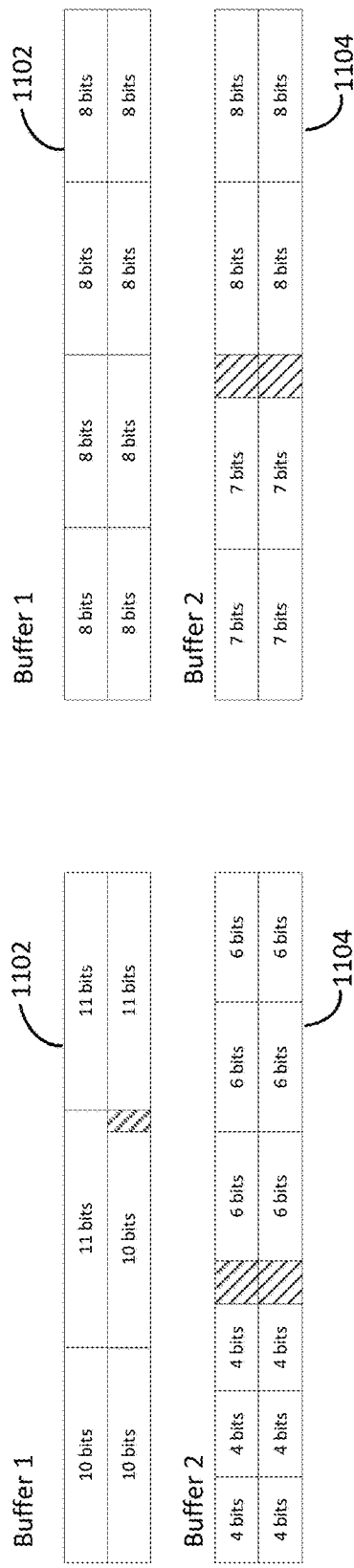
FIGS. 11A-11B illustrate unsynchronized and synchronized packing arrangements, in accordance with some embodiments

Balancing channels may also be desirable in embodiments where data blocks are received from more than two channels. If a particular channel has significantly more bits than another channel, blocking may occur. For example, when data is being unpacked from the DDR through the DMA path, data from channels with a large block size may block data from channels with a smaller block size. In some embodiments, this may be referred to as the channels being "unsynchronized." For example, FIG. 11A illustrates an unsynchronized packing arrangement, in accordance with some embodiments. As illustrated in FIG. 11A, a DDR may comprise a first buffer 1102 for packing data blocks from a first channel and a second channel (having data block sizes of 11 bits and 10 bits respectively), and a second buffer 1104 for packing data blocks from a third channel and fourth channel (having data block sizes of 6 bits and 4 bits respectively). In some embodiments, even if the two channels in each particular buffer are balanced with each other (e.g., the first channel being balanced with the second channel, the third channel being balanced with the fourth channel), when data is being unpacked, data from the first and second channels, which are much larger in block size than the third and fourth channels, may come in too fast and block data from the third and fourth channels.

FIG. 11B illustrates a synchronized packing arrangement, in accordance with some embodiments. As illustrated in the figure, all four channels are balanced (having respective data block sizes of 8 bits, 8 bits, 8 bits, and 7 bits). As a result, because all four channels are balanced in size, occurrences of blocking may be greatly reduced.

In some embodiments, in order to balance the data block sizes of received channels (hereinafter also referred to as physical channels), the received channels are mapped to virtual channels having balanced data block sizes. The virtual channels are then packed into DDR buffers using one or more packers. In some embodiments, the one or more packers may be LCLCPs, wherein each LCLCP packs data blocks from two virtual channels into words of the DDR buffer. In order to retrieve the packed data, the data blocks of the virtual channels may be unpacked and mapped back to the physical channels.

Figure 12A:
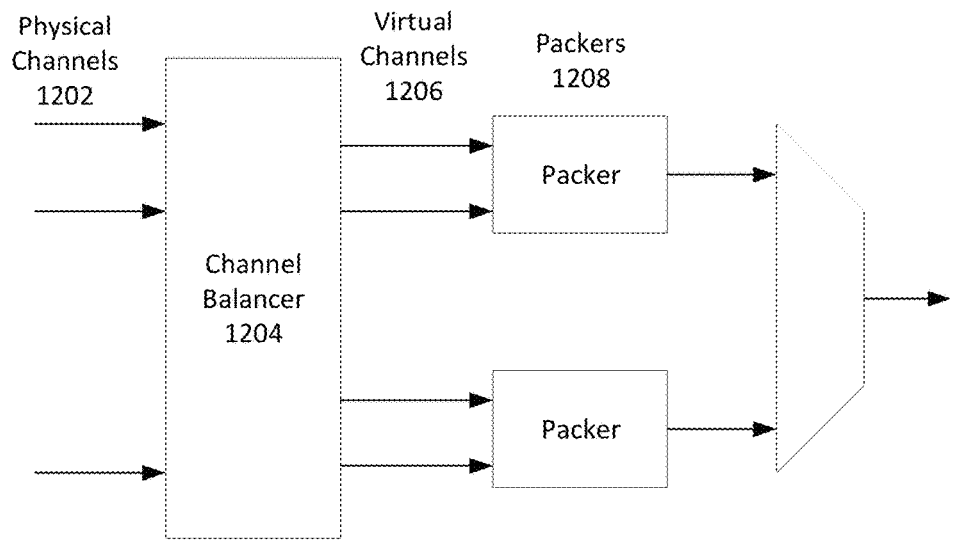
FIG. 12A illustrates how physical channels can be balanced and mapped to virtual channels, in accordance with some embodiments.

For example, FIG. 12A illustrates how physical channels can be balanced and mapped to virtual channels, in accordance with some embodiments. A plurality of physical channels 1202 may be received by a channel balancer 1204. Channel balancer 1204 maps the data blocks of the physical channels 1202 to a plurality of virtual channels 1206. In some embodiments, how channel balancer 1204 maps the physical channels 1202 may be based upon the number and block sizes of the physical channels 1202, as well as a word size of the buffer to which the data is to be packed.

The virtual channels 1206 are then packed by a plurality of packers 1208 into words, which are then stored in a DDR buffer. In some embodiments, the number of virtual channels 1206 is configured to be a multiple of two, such that two virtual channels are assigned to each packer of the plurality of packers 1208. In some embodiments, packers 1208 are LCLCPs, wherein each packer packs data blocks from the two channels assigned to it from opposite sides of a word.

Figure 13:
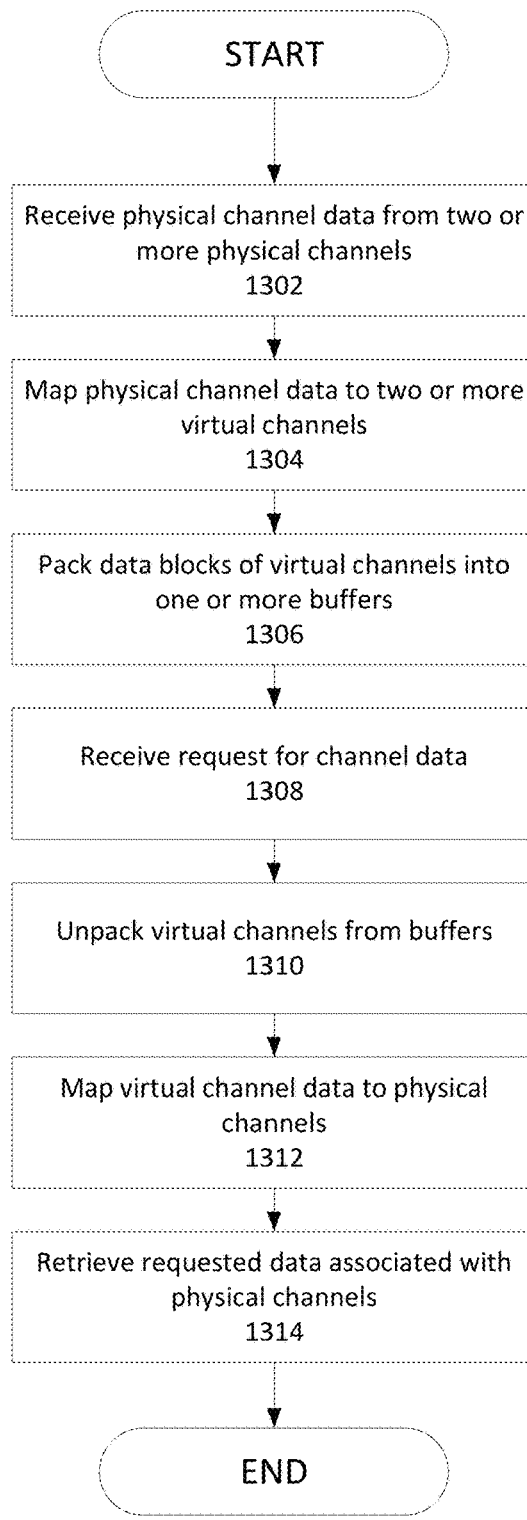
FIG. 13 illustrates a flowchart of a process for packing and retrieving channel data using balanced channels, in accordance with some embodiments.

FIG. 13 illustrates a flowchart of a process for packing and retrieving channel data using balanced channels, in accordance with some embodiments. At block 1302, data is received from two or more physical channels, comprising a plurality of data blocks. In some embodiments, the physical channels may correspond to one more different processes that may be performed using saved neighborhood data (e.g., a de-interlacer, a down/up scaler, and/or the like).

At block 1304, the data blocks received from the physical channels are mapped to two or more virtual channels. In some embodiments, the physical channels may be mapped such that the block sizes of virtual channels are balanced with each other (e.g., using a channel balancer, as illustrated in FIG. 12A). In some embodiments, the number of virtual channels used and the block sizes of the virtual channels may be based upon the number and block sizes of the physical channels, as well as a word size of the DDR buffer. Examples of determining how many virtual channels are used and the block sizes of the virtual channels are described in greater detail below.

At block 1306, the data blocks from the virtual channels are packed into at least one buffer. In some embodiments, each buffer is configured to store a plurality of words, each word comprises a series of bits that extend between a first side of the word and a second side of the word. In some embodiments, the virtual channels are assigned to one or more packers. For example, the packers may comprise one or more LCLCPs, wherein each LCLCP is configured to pack two virtual channels into words a DDR buffer. For example, the LCLCP may pack data blocks from the two virtual channels from opposite sides of the words of the DDR buffer.

At block 1308, a request is received for data associated with the two or more physical channels is received. In response, at block 1310, the data blocks corresponding to the virtual channels are unpacked. In some embodiments, the data blocks may be unpacked using one or more LCLCPs, each LCLCP unpacking data blocks from two virtual channels associated with data blocks packed to the same word.

At block 1312, the virtual channel data blocks are mapped back to the physical channels. At block 1314, the requested data associated with the physical channels may be retrieved.

Figure 14:
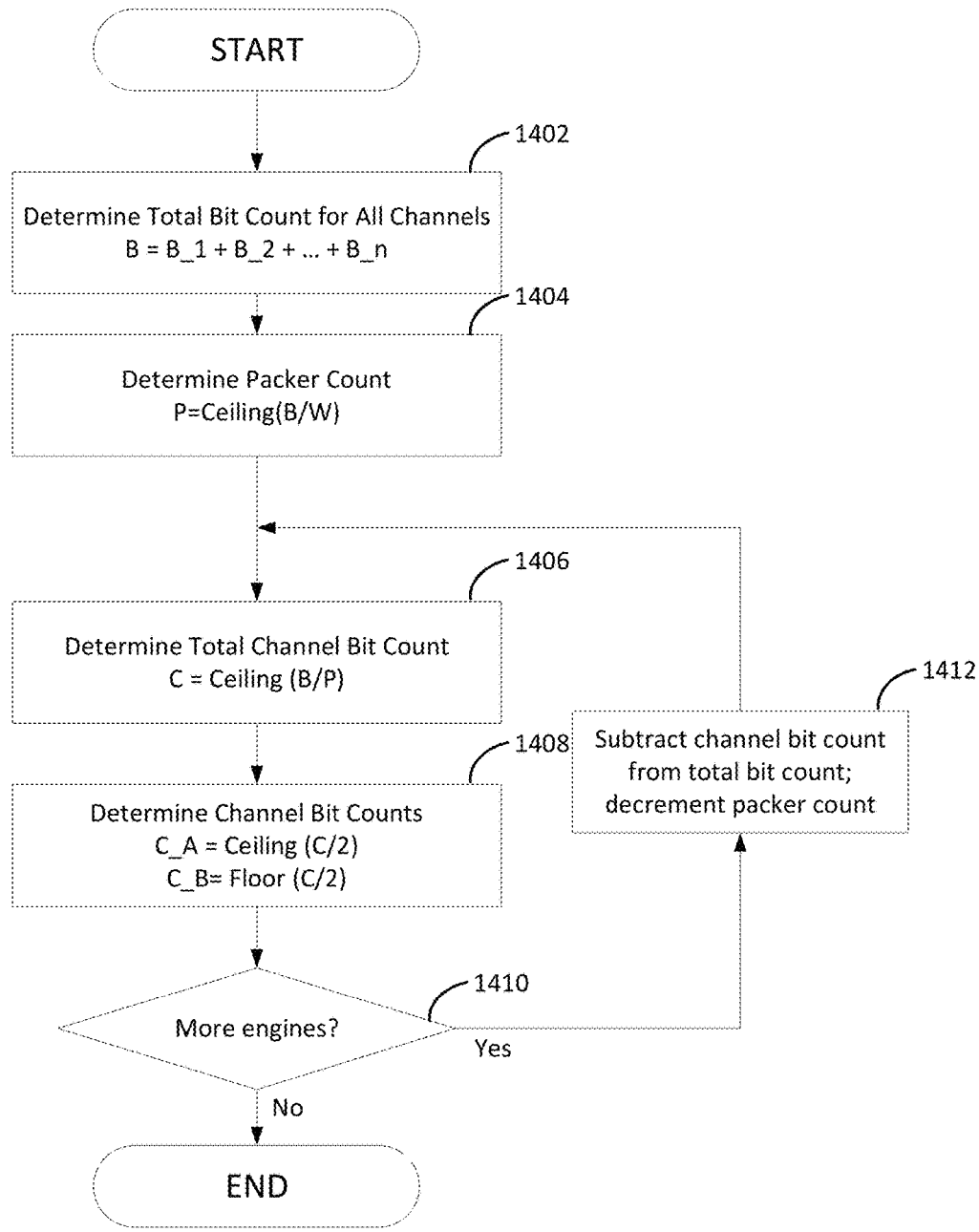
FIG. 14 illustrates a flowchart of a process for calculating the number and block sizes of the virtual channels when balancing channels, in accordance with some embodiments.

FIG. 14 illustrates a flowchart of a process for calculating the number and block sizes of the virtual channels when balancing channels, in accordance with some embodiments. In some embodiments, data blocks from n physical channels are to be packed, the channels having block sizes of $B\_1$, $B\_2$, ... $B\_n$. In addition, the DDR buffer is configured to store words having a word size of W.

At block 1402, a total bit count for all physical channels being balanced is computed. In some embodiments, the total bit count B is calculating by determining a sum of the block sizes of all physical channels being received ($B\_1$, $B\_2$, ... $B\_n$).

At block 1404, a total packer count is determined. In some embodiments, the total packer count corresponds to a number of packers (e.g., LCLCPs) that will be used to pack the data blocks from the virtual channels, and may be calculated by dividing the total bit count B by the word size W, rounded up. In some embodiments, each packer is associated with two virtual channels.

For a first packer of the one or more packers, a total channel bit count C is calculated at block 1406, corresponding to the combined block size of the two virtual channels associated with the packer. In some embodiments, the total channel bit count may be calculated by dividing the total bit count B by the total packer count P, rounded up.

At block 1408, the block sizes for each channel (also referred to as channel bit counts) associated with the packer are calculated. In some embodiments, the block sizes of two channels ($C\_A$ and $C\_B$, corresponding to Channel A and Channel B) may be calculated as half of the total channel bit count rounded up, and half of the total channel bit count rounded down, respectively. As such, in some embodiments the bit counts for Channel A and Channel B will either be identical (if total channel bit count C is even) or differ by one bit (if total channel bit count C is odd).

At block 1410, a determination is made as whether or not there are additional packers to be processed. If so, the process proceeds to block 1412, where total bit count B is decremented by the total channel bit count C, and total packer count P is decremented by one. The process may then return to block 1406, where a new total channel bit count C is calculated for the next packer of the one or more packers.

As a result, data from the n received physical channels will be mapped to 2*P virtual channels associated with P different packers. Each packer is associated with two channels, which will be balanced with each other such that they have block sizes that are the same or differ by one bit.

Channel Balancing Example

Figure 12B:
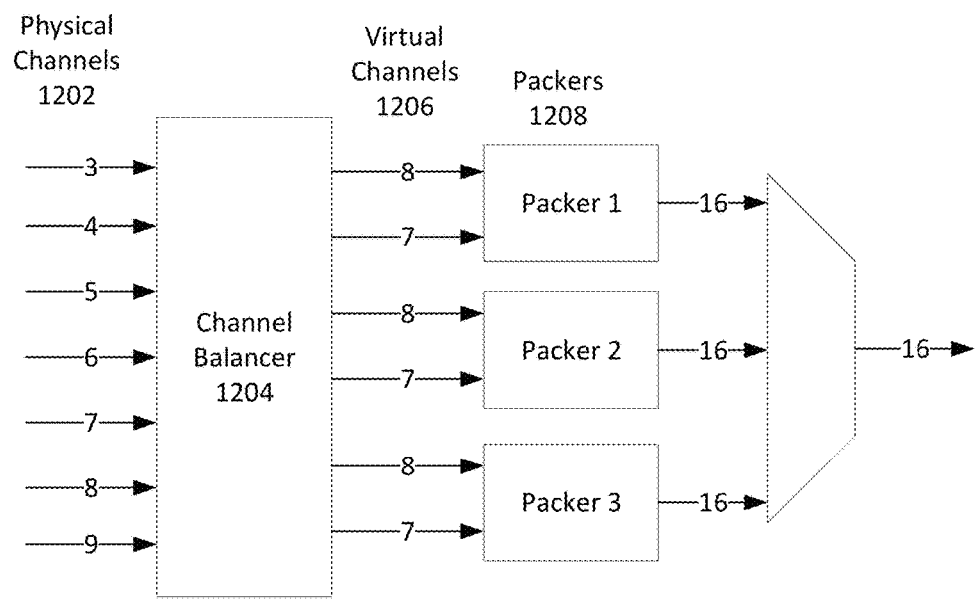
FIG. 12B illustrates physical channels being mapped to balanced virtual channels in accordance with a particular example.
Figure 15:
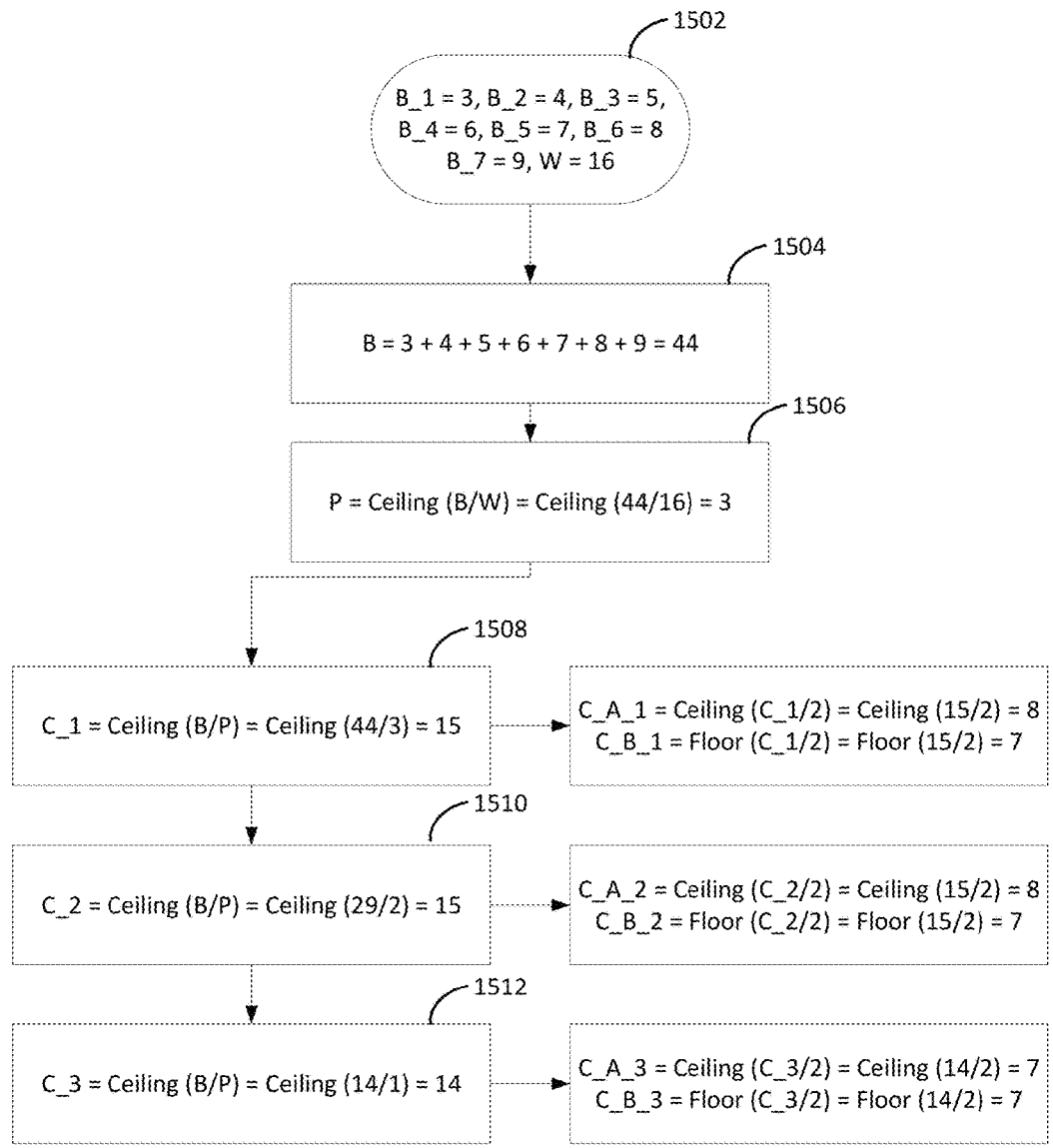
FIG. 15 illustrates a flowchart of a particular example for calculating virtual channel block sizes when balancing channels.

FIG. 15 illustrates a flowchart of a particular example for calculating virtual channel block sizes when balancing channels. FIG. 12B illustrates physical channels being mapped to balanced virtual channels in accordance with the example. In this example, as shown at block 1502, data is received from 7 physical channels, the channels having bit counts of 3, 4, 5, 6, 7, 8, and 9 bits. In addition, the DDR buffer is configured to store words having a word size of 16 bits.

At block 1504, a total bit count B is calculated by taking a sum of the bit counts of the received physical channels. In the example, B is calculated to have a value of 44 (3+4+5+6+7+8+9).

At block 1506, a total packer count is calculated. For example, the total packer count P is calculated as ceiling (44/16)=3. This indicates that three packers will be used to pack the data blocks.

At block 1508, a total channel bit count $C\_1$ is calculated for the first packer. Because total bit count B is 44, and total packer count P is 3, $C\_1$ is calculated to be ceiling(44/3)=15. Subsequently, channel bit counts $C\_A\_1$ and $C\_B\_1$ can be calculated as 8 bits and 7 bits respectively.

After channel bit counts are calculated for the first packer, the total bit count B is decremented by the total channel bit count $C\_1$, and the total packer count P is decremented by 1. As such, the new values for B and P are 29 and 2, respectively.

At block 1510, a total channel bit count $C\_2$ is calculated for the first packer. Because total bit count B is 29, and total packer count P is 2, $C\_2$ is calculated to be ceiling(29/2)=15. Subsequently, channel bit counts $C\_A\_2$ and $C\_B\_2$ can be calculated as 8 bits and 7 bits respectively.

After channel bit counts are calculated for the packer, the total bit count B is decremented by the total channel bit count $C\_2$, and the total packer count P is decremented by 1. As such, the new values for B and P are 14 and 1, respectively.

At block 1512, a total channel bit count $C\_3$ is calculated for the first packer. Because total bit count B is 14, and total packer count P is 1, $C\_3$ is calculated to be ceiling(14/1)=14. Subsequently, channel bit counts $C\_A\_3$ and $C\_B\_3$ can be calculated as 7 bits and 7 bits respectively.

Thus, as illustrated in FIG. 12B, the seven physical channels have been mapped to six virtual channels associated with three packers. The six virtual channels have bit count values of 8 bits, 7 bits, 8 bits, 7 bits, 7 bits, and 7 bits.

By mapping the physical channels into balanced virtual channels, words in the DDR buffer can be packed more efficiently, reducing the storage space required in the DDR. In addition, the virtual channels will be balanced such that blocking is when unpacking data from the DDR buffer.

OTHER CONSIDERATIONS

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, ASICs, FPGAs, or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. A method operable by a video coding circuit for packing video data, comprising:
    receiving the video data from two or more physical channels, the video data comprising a plurality of data blocks;
    mapping the data blocks from the physical channels to two or more virtual channels; and
    packing data blocks of the virtual channels into at least one buffer, the at least one buffer configured to store a plurality of words, each word comprising a series of bits that extends between a first bit at a first side and last bit at a second side,
    wherein the packing further comprises interleaving data blocks from a first virtual channel with data blocks from a second virtual channel via:
        packing the data blocks from the first virtual channel in a first direction from the first side toward the second side; and
        packing the data blocks from the second virtual channel in a second direction that is opposite of the first direction.

2. The method of claim 1, wherein a first data block size of a first physical channel of the two or more physical channels is different from a second data block size of a second physical channel of the two or more physical channels.

3. The method of claim 1, further comprising:
    receiving a request for one or more data blocks associated with a physical channel of the two or more physical channels;
    unpacking virtual channel data from the one or more buffers;
    mapping the virtual channel data to one or more physical channels; and
    retrieving the requested data blocks through the physical channel.

4. The method of claim 1, wherein a number of buffers used to pack data from the two or more virtual channels is based at least in part upon a ratio between a total bit count of the two or more physical channels and a number of word bits of a buffer of the one or more buffers.

5. The method of claim 1, wherein each buffer of the one or more buffers is packed with data blocks from two virtual channels of the two or more virtual channels.

6. The method of claim 1, wherein a bit count of the first virtual channel and a bit count of the second virtual channel are balanced such that they are identical or differ by one bit.

7. The method of claim 1, wherein a bit count of a virtual channel is based at least in part upon a total bit count of the two or more physical channels and a number buffers of the one or more buffers.

8. A video coding circuit for packing video data, comprising:
    a memory configured to store the video data; and
    a processor in communication with the memory and configured to:
        receive the video data from two or more physical channels, the video data comprising a plurality of data blocks;
        map the data blocks from the physical channels to two or more virtual channels; and
        pack data blocks of the virtual channels into at least one buffer, the at least one buffer configured to store a plurality of words, each word comprising a series of bits that extends between a first bit at a first side and last bit at a second side,
        wherein the data blocks from a first virtual channel and the data blocks from a second virtual channel of the two or more virtual channels are packed in an interleaving order, wherein the data blocks from the first virtual channel are packed in a first direction from the first side toward the second side, and the data blocks from the second virtual channel are packed in a second direction that is opposite of the first direction.

9. The video coding circuit of claim 8, wherein a first data block size of a first physical channel of the two or more physical channels is different from a second data block size of a second physical channel of the two or more physical channels.

10. The video coding circuit of claim 8, wherein the processor is further configured to:
- receive a request for one or more data blocks associated with a physical channel of the two or more physical channels;
- unpack virtual channel data from the one or more buffers;
- map the virtual channel data to one or more physical channels; and
- retrieve the requested data blocks through the physical channel.

11. The video coding circuit of claim 8, wherein a number of buffers used to pack data from the two or more virtual channels is based at least in part upon a ratio between a total bit count of the two or more physical channels and a number of word bits of a buffer of the one or more buffers.

12. The video coding circuit of claim 8, wherein each buffer of the one or more buffers is packed with data blocks from two virtual channels of the two or more virtual channels.

13. The video coding circuit of claim 8, wherein a bit count of the first virtual channel and a bit count of the second virtual channel are balanced such that they are identical or differ by one bit.

14. The video coding circuit of claim 8, wherein a bit count of a virtual channel is based at least in part upon a total bit count of the two or more physical channels and a number buffers of the one or more buffers.

\* \* \* \* \*